United States Patent
Higuchi et al.

(10) Patent No.: US 10,833,921 B2
(45) Date of Patent: Nov. 10, 2020

(54) INFORMATION PROCESSING APPARATUS AND ABNORMALITY DIAGNOSIS METHOD

(71) Applicant: FUJITSU LIMITED, Kawasaki (JP)

(72) Inventors: Junichi Higuchi, Kawasaki (JP); Ken Yokoyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/451,515

(22) Filed: Jun. 25, 2019

(65) Prior Publication Data

US 2020/0059399 A1  Feb. 20, 2020

(30) Foreign Application Priority Data

Aug. 20, 2018 (JP) .................................. 2018-154215

(51) Int. Cl.
- *H04L 12/24* (2006.01)
- *H04L 12/26* (2006.01)

(52) U.S. Cl.
CPC ........ *H04L 41/0695* (2013.01); *H04L 41/026* (2013.01); *H04L 41/0273* (2013.01); *H04L 41/0631* (2013.01); *H04L 43/045* (2013.01)

(58) Field of Classification Search
CPC ............... H04L 41/0695; H04L 43/045; H04L 41/0631; H04L 41/0273; H04L 41/026; H04L 41/5009; H04L 43/0852
See application file for complete search history.

(56) References Cited

U.S. PATENT DOCUMENTS

| | | | |
|---|---|---|---|
| 2010/0238820 | A1 | 9/2010 | Yokoyama |
| 2014/0258788 | A1* | 9/2014 | Maruyama .......... G06F 11/3452 714/47.3 |
| 2016/0357895 | A1* | 12/2016 | Hyde ...................... G06F 30/20 |
| 2020/0059399 | A1* | 2/2020 | Higuchi ................ H04L 41/026 |

FOREIGN PATENT DOCUMENTS

| | | |
|---|---|---|
| JP | 2008-130010 | 6/2008 |
| JP | 2010-218185 | 9/2010 |
| JP | 2015-012361 | 1/2015 |

* cited by examiner

*Primary Examiner* — Michael Won
(74) *Attorney, Agent, or Firm* — Fujitsu Patent Center

(57) ABSTRACT

An information processing apparatus includes: a processor configured to: acquire message data that indicate a message size and a response time of each response message identified from an encrypted packet group; identify, based on the message data, first peak sizes that satisfy a first condition from a first size distribution of the message size of each response message; determine based on the message data, when the first peak sizes include a second peak size different from third peak sizes, whether a first time distribution satisfies a second condition, the third peak sizes being peak sizes of the message size of each response message in a normal state, the first time distribution being a frequency distribution of the response time of each response message having the second peak size; and determine that a service is abnormal, when the first time distribution satisfies the second condition.

10 Claims, 20 Drawing Sheets

FIG. 8

| CLASS VALUE [byte] | CLASS [byte] | FREQUENCY |
|---|---|---|
| ... | ... | ... |
| 710 | 705~715 | 0.06 |
| 720 | 715~725 | 0.08 |
| 730 | 725~735 | 0.12 |
| 740 | 735~745 | 0.07 |
| 750 | 745~755 | 0.08 |
| ... | ... | ... |

| | ABNORMAL PEAK SIZE TABLE | ~ 900 |

| | DATE AND TIME | ABNORMAL PEAK SIZE [byte] |
|---|---|---|
| 900-1 | 2018/02/13 09:00:00 | 80 |
| 900-2 | 2018/02/13 09:10:00 | NA |
| | 2018/02/13 09:20:00 | 550 |
| | 2018/02/13 09:30:00 | 190, 730 |
| | 2018/02/13 09:40:00 | NA |
| 900-6 | 2018/02/13 09:50:00 | NA |

FIG. 10

| REPRESENTATIVE RESPONSE SIZE [byte] | CLASS VALUE [msec] | CLASS [msec] | FREQUENCY |
|---|---|---|---|
| ... | ... | ... | ... |
| 730 | 10 | 5~15 | 0.04 |
| 730 | 20 | 15~25 | 0.11 |
| 730 | 30 | 25~35 | 0.30 |
| 730 | 40 | 35~45 | 0.08 |
| 730 | 50 | 45~55 | 0.15 |
| ... | ... | ... | ... |

| | ABNORMALITY DIAGNOSIS RESULT TABLE | ~ 1100 |

| DATE AND TIME | DIAGNOSIS RESULT |
|---|---|
| 2018/02/13 09:00:00 | NORMAL |
| 2018/02/13 09:10:00 | NORMAL |
| 2018/02/13 09:20:00 | ABNORMAL |
| 2018/02/13 09:30:00 | ABNORMAL |
| 2018/02/13 09:40:00 | NORMAL |
| 2018/02/13 09:50:00 | NORMAL |

ABNORMALITY DIAGNOSIS RESULT SCREEN

| DATE AND TIME | SERVICE TYPE | STATUS | OCCURRENCE PERIOD |
|---|---|---|---|
| 2018/02/13 09:30:22.012 | TIME MANAGEMENT SERVICE | ABNORMAL | 2018/02/13 09:20~09:30 |
| 2018/02/13 09:30:22.015 | PERSONNEL SERVICE | ABNORMAL | 2018/02/13 09:20~09:30 |
| 2018/02/13 09:40:21.524 | TIME MANAGEMENT SERVICE | ABNORMAL | 2018/02/13 09:30~09:40 |
| 2018/02/13 09:40:22.526 | PERSONNEL SERVICE | ABNORMAL | 2018/02/13 09:30~09:40 |
| 2018/02/13 09:40:22.530 | PURCHASE SERVICE | ABNORMAL | 2018/02/13 09:30~09:40 |

1500

1501
1502
1503
1504
1505

INFORMATION PROCESSING APPARATUS AND ABNORMALITY DIAGNOSIS METHOD

CROSS-REFERENCE TO RELATED APPLICATION

This application is based upon and claims the benefit of the prior Japanese Patent Application No. 2018-154215 filed on Aug. 20, 2018, the entire contents of which are incorporated herein by reference.

FIELD

The embodiments discussed herein are related to an information processing apparatus and an abnormality diagnosis method.

BACKGROUND

In the related art, there is a demand for diagnosing an abnormality in the operation phase of a web service which is provided by a system constructed on a server in a data center. As an abnormality diagnosis method in the operation phase, there is, for example, a method of acquiring a packet which is transmitted and received by the communication related to the web service, and diagnosing the abnormality of the web service from a hypertext transfer protocol (HTTP) status code in the acquired packet.

As a related art, there is, for example, a technique of periodically observing a fluctuation in the response time of a web server, and when the response time deteriorates, identifying the cause of the access concentration that has caused the deterioration in the response time by comparison with the reference situation from an external web site. In addition, there is a technique of statistically processing a delay time in transferring the acquired packet, a response time, and a QoE evaluation value for each individual process, thereby creating an estimation model that indicates a correlation between the packet transfer delay time and the QoE evaluation value, and determining a QoE estimation value based on the estimation model. Further, there is a technique of calculating a processing time of an upper layer server for the processing of a lower layer server, which is performed between the processing chunks of the lower layer servers, using a difference between the reception time of a first packet and the reception time of the last packet in the processing chunk of the upper layer server.

Related techniques are disclosed in, for example, Japanese Laid-Open Patent Publication No. 2008-130010, Japanese Laid-Open Patent Publication No. 2015-012361, and Japanese Laid-Open Patent Publication No. 2010-218185.

However, in the related art, it may not be possible to diagnose an abnormality of the web service. For example, when the communication is encrypted, since the protocol analysis of the data packet of the response may not be performed, the HTTP status code may not be acquired to detect an abnormality.

SUMMARY

According to an aspect of the embodiments, an information processing apparatus includes: a memory; and a processor coupled to the memory and the processor configured to: acquire message data that indicate a message size and a response time of each response message identified from an encrypted packet group which is transmitted and received within a predetermined period; identify, based on the acquired message data, first peak sizes that satisfy a first condition from a first size distribution that is a frequency distribution of the message size of each response message; determine based on the acquired message data, when it is determined that the first peak sizes include a second peak size different from third peak sizes, whether a first time distribution satisfies a second condition, the third peak sizes being peak sizes of the message size of each response message in a normal state and being stored in the memory, the first time distribution being a frequency distribution of the response time of each response message having the second peak size; and determine that a service is abnormal, when it is determined that the first time distribution satisfies the second condition.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 8 is an explanatory diagram illustrating an example of storage contents of a response size frequency distribution table 800;

FIG. 9 is an explanatory diagram illustrating an example of storage contents of an abnormal peak size table 900;

FIG. 10 is an explanatory diagram illustrating an example of storage contents of a response time frequency distribution table 1000;

FIG. 11 is an explanatory diagram illustrating an example of storage contents of an abnormality diagnosis result table 1100;

FIG. 15 is an explanatory diagram (part 1) illustrating a screen example of an abnormality diagnosis result screen;

DESCRIPTION OF EMBODIMENTS

Hereinafter, embodiments will be described with reference to the accompanying drawings.

Embodiments

First, a system configuration example of an abnormality diagnosis system 100 according to an embodiment will be described. The abnormality diagnosis system 100 is a computer system that performs an abnormality diagnosis of the service provided by a network system.

Figure 1:
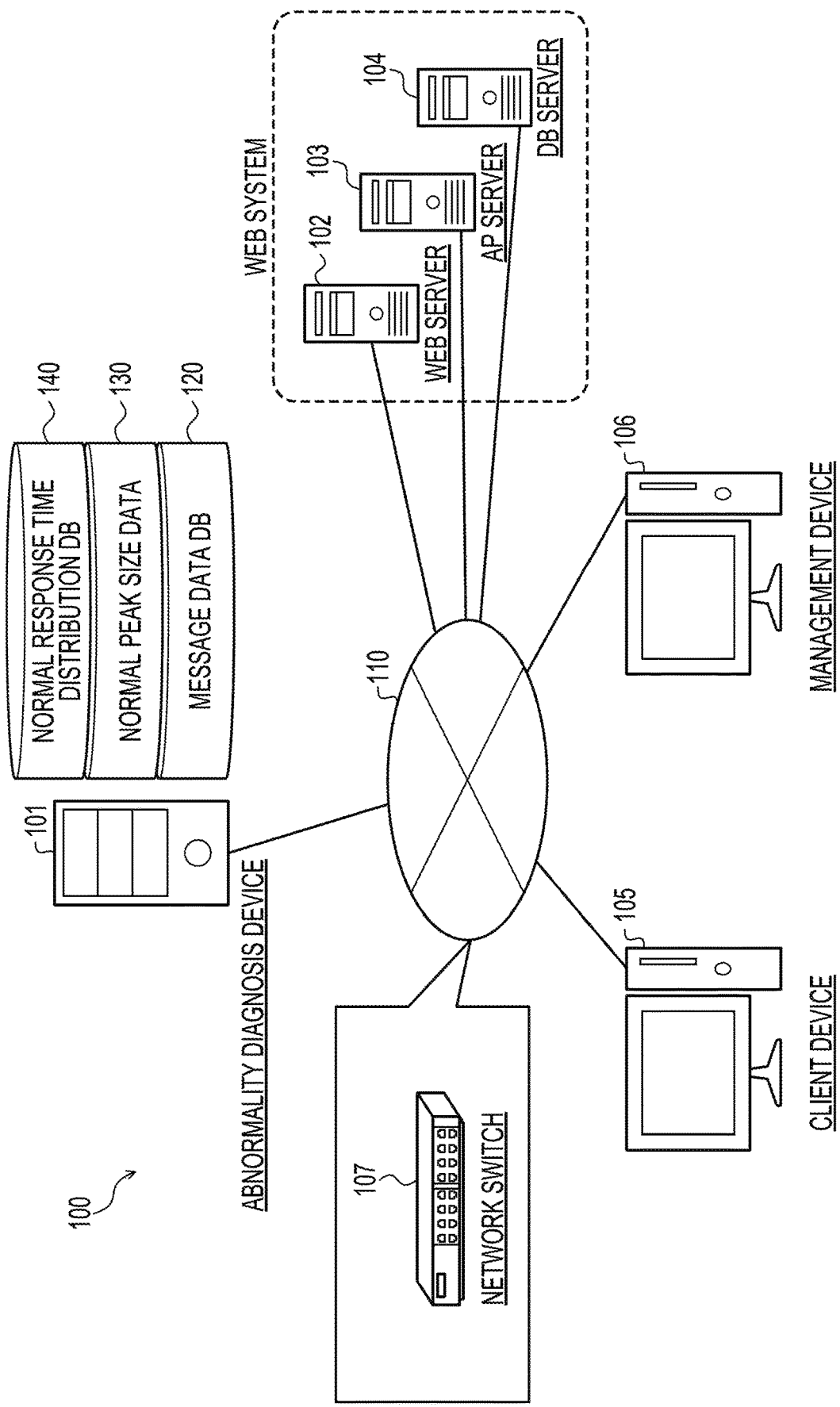
FIG. 1 is an explanatory diagram illustrating a system configuration example of an abnormality diagnosis system 100.

FIG. 1 is an explanatory diagram illustrating a system configuration example of the abnormality diagnosis system 100. In FIG. 1, the abnormality diagnosis system 100 includes an abnormality diagnosis device 101, a web server 102, an AP server 103, a DB server 104, a client device 105, and a management device 106. In the abnormality diagnosis system 100, the abnormality diagnosis device 101, the web server 102, the AP server 103, the DB server 104, the client device 105, and the management device 106 are connected to each other via a wired or wireless network 110. The network 110 is, for example, a local area network (LAN), a wide area network (WAN), the Internet, or the like. The network 110 includes a network switch 107.

Here, the abnormality diagnosis device 101 is a computer that performs an abnormality diagnosis of a service to be diagnosed. The service to be diagnosed is, for example, a web service provided by a web system. The web system is, for example, a three-layer system which is constructed by the web server 102, the AP server 103, and the DB server 104.

The abnormality diagnosis device 101 includes a message data database (DB) 120, normal peak size data 130, and a normal response time distribution DB 140. Further, the storage contents of the message data DB 120, the normal peak size data 130, and the normal response time distribution DB 140 will be described later with reference to FIGS. 4 to 6.

The web server 102 is a computer that transmits data such as a web page in response to the request from a browser of the client device 105. The AP server 103 is a computer that bridges the web server 102 and the DB server 104 so as to control a database search/update processing. The DB server 104 is a computer that executes a database search/update processing.

The client device 105 is a computer used by a user who uses a service. The management device 106 is a computer used by an administrator of the abnormality diagnosis system 100. The client device 105 and the management device 106 are, for example, a personal computer (PC), a tablet PC, a smartphone, and the like.

The network switch 107 is a communication device that has a line switching function, selects a route, and relays information to an appropriate transfer destination. Also, the network switch 107 has a function of mirroring data that passes through itself. Mirroring is a function of outputting the same data as that output to a certain port from another port as well.

For example, a port connected to the abnormality diagnosis device 101 is designated as a mirroring destination of a port connected to the web server 102. Therefore, the packet received by the web server 102 is input to the web server 102 which is a destination and also input to the abnormality diagnosis device 101.

In addition, in the abnormality diagnosis system 100, when the client device 105 and the web system communicate with each other, it is assumed that a request message and a response message are serially exchanged in, for example, the same transmission control protocol (TCP) connection.

Further, although only one web server 102, one AP server 103, one DB server 104, and one client device 105 are illustrated in FIG. 1, two or more of these components may be used. In addition, the network 110 may include two or more network switches 107.

Here, when performing an abnormality diagnosis of the web service in the operation phase, there is a method of acquiring a packet that is transmitted and received by the communication related to the web service, and diagnosing an abnormality from the HTTP status code in the acquired packet. The HTTP status code is a code that indicates the status of a server with respect to a request.

For example, the 200s of the HTTP status code indicate a normal processing. The 300s thereof indicate redirection. The 500s thereof indicate server errors. Therefore, for example, when the HTTP status code in the packet is in the 500s, it may be detected that an abnormality occurs.

However, when the communication is encrypted, a protocol analysis of the data packet of a response may not be performed, and the HTTP status code in the packet may not be acquired. For this reason, it is not possible to detect an abnormality due to a failure of the web service, which frequently causes service unavailability.

It is also conceivable to detect an abnormality due to a failure of the web service from the change in the number of requests. However, when a failure occurs, the number of requests may decrease because services are not available, or the client may repeat requests so as to increase the number of requests. That is, it is difficult to diagnose an abnormality only by the number of requests. In addition, such cases may not be distinguished from a case where the number of requests increases or decreases in a normal state.

Therefore, in the present embodiment, descriptions will be made on a case where a communication between the client and the server is encrypted for the service to be diagnosed, that is, an abnormality diagnosis method which enables an abnormality diagnosis even for an encrypted communication packet. Here, an example of the abnormality diagnosis method according to the embodiment will be described.

Figure 2:
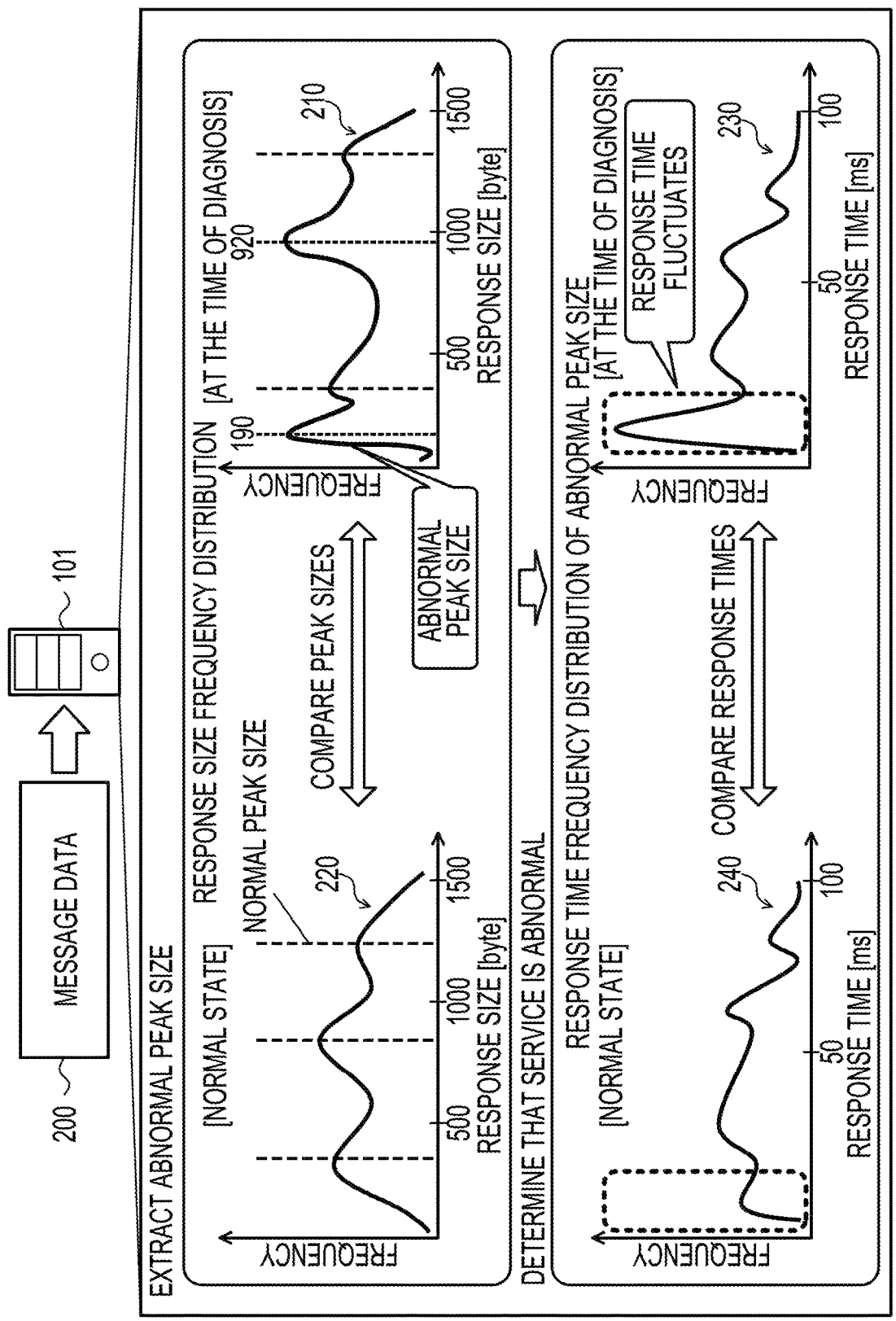
FIG. 2 is an explanatory diagram illustrating an example of an abnormality diagnosis method according to an embodiment.

FIG. 2 is an explanatory diagram illustrating an example of the abnormality diagnosis method according to the embodiment. Hereinafter, processing examples (1) to (4) of the abnormality diagnosis device 101 will be described.

(1) The abnormality diagnosis device 101 acquires message data that indicate the message size and the response time of the response message identified from a packet group which is transmitted and received within a predetermined period T. Here, the predetermined period T is a target period in which the service abnormality diagnosis is performed, and may be arbitrarily set. For example, the predetermined period T is set to a period of about 5 minutes to 10 minutes.

The packet group is a packet group which is transmitted and received by the communication related to the service to be diagnosed, and is, for example, a packet group in which a data portion is encrypted. Therefore, the protocol analysis of the packet (data packet) may not be performed, and the HTTP status code in the packet may not be acquired. However, the packet group may not be encrypted. The message size is a size of the message and is represented by, for example, a sum of the sizes of the packets which form the message. The response time is the time until a response message is returned to the request message.

In the example of FIG. 1, it is assumed that message data 200 is acquired. The message data 200 indicates the message size and the response time of the response message that is transmitted from the web server 102 to the client device 105 within a predetermined period T.

(2) Based on the acquired message data, the abnormality diagnosis device 101 identifies a peak size that satisfies a first condition from the frequency distribution of the message size of the response message. Here, the frequency distribution of the message size of the response message indicates, for each class divided by a predetermined size width, the frequency of the response message to which the message size belongs to the class. The predetermined size width may be set arbitrarily and is set to, for example, a width of about 10 [bytes].

In the following description, the frequency distribution of the message size of the response message may be referred to as a "response size frequency distribution." That is, the response size frequency distribution indicates, for each message size class, how often the response message of the class appears with respect to the total number of response messages.

The first condition may be set arbitrarily. As the first condition, for example, a condition that determines a peak size (class) in which response messages are concentrated is set. Specifically, for example, in the response size frequency distribution, the abnormality diagnosis device 101 identifies, as a peak size that satisfies the first condition, a message size corresponding to a class whose difference in frequency with adjacent classes is equal to or more than a threshold α.

The threshold α may be set arbitrarily and is set to, for example, a value of about 0.01 to 0.05. The message size corresponding to the class is, for example, a representative value of the class (the middle value in the class). For example, when the class is "185 [bytes] to 195 [bytes]," the representative value thereof is "190 [bytes]."

In the example of FIG. 1, it is assumed that the peak sizes of "190, 920" that satisfy the first condition are identified from the response size frequency distribution 210 (unit: byte). The response size frequency distribution 210 is a frequency distribution of message sizes of response messages based on the message data 200.

(3) The abnormality diagnosis device 101 determines whether there is a peak size different from the peak size of the response message in a normal state stored in advance among the identified peak sizes. Then, when there is a different peak size, the abnormality diagnosis device 101 determines whether the frequency distribution of response times of the response message of the different peak size satisfies a second condition based on the acquired message data.

Here, the peak size of the response message in a normal state refers to a peak size in the response size frequency distribution when no failure occurs in the service to be diagnosed. Further, the frequency distribution of response times of the response message indicates, for each of the classes divided by a predetermined time width, the frequency of the response message to which the response time belongs to the class. The predetermined time width may be set arbitrarily and is set to, for example, a width of about 10 [msec].

In the following description, the peak size of the response message in a normal state may be referred to as a "normal peak size." In addition, the frequency distribution of response times of the response message may be referred to as a "response time frequency distribution." That is, the response time frequency distribution indicates, for each response time class, how often the response message of the class appears with respect to the total number of response messages.

Also, the second condition may be set arbitrarily. The second condition is set to, for example, a condition that the response time frequency distribution of response messages of peak sizes different from the normal peak size is statistically different from the response time frequency distribution of response messages in a normal state.

Specifically, for example, the abnormality diagnosis device 101 compares the response time frequency distribution of response messages having the different peak size with the response time frequency distribution of response messages in a normal state. Then, as a result of comparison, the abnormality diagnosis device 101 determines that the second condition is satisfied when it is determined that there is a fluctuation in response time.

In the example of FIG. 1, a response size frequency distribution 220 represents a frequency distribution of the message size of the response message in a normal state. The normal peak sizes identified from the response size frequency distribution 220 are set to "310, 920, 1280." In this case, in the peak sizes of "190, 920" that satisfy the first condition, the peak size of "190" is a peak size different from the normal peak size.

Further, it is assumed that the response time frequency distribution of response messages of the different peak size of "190" is a response time frequency distribution 230, and the response time frequency distribution of response messages in a normal state is a response time frequency distribution 240. In this case, when the response time frequency distribution 230 and the response time frequency distribution 240 are compared with each other, it is determined that the second condition is satisfied because there is a fluctuation in response time (see the dotted frame portion in FIG. 2).

(4) When the second condition is satisfied, the abnormality diagnosis device 101 determines that the service is abnormal. Here, the service abnormality refers to a state in which an abnormality has occurred due to a service failure. In the example of FIG. 1, since the second condition is satisfied, it is determined that the service is abnormal.

As described above, according to the abnormality diagnosis device 101, it is possible to diagnose a service abnormality without analyzing the contents of a packet (data portion). For this reason, when a communication between the client and the server is encrypted, that is, even in the case of an encrypted communication packet, it is possible to diagnose the service abnormality.

Specifically, in a normal state, the message size of the response message tends to fluctuate depending on which service or function is accessed. Meanwhile, when an abnormality such as a server error occurs, the message size of the response message tends to be concentrated around a particular value for each status code, even for different request types (e.g., URL, etc.). For example, when the number of response messages that display an error message increases rapidly, the message size is biased to a particular value. Using this tendency, the abnormality diagnosis device 101 extracts, as an abnormal peak size, a peak size which is different from the peak size in a normal state among the peak sizes which appear in the response size frequency distribution obtained from the packet group for service.

However, even when an abnormality does not occur, the message size of the response message may be concentrated around a particular value. For example, the message size of response messages for redirection and static contents also tends to be concentrated around a particular value. Therefore, merely focusing on the message size may not ensure the accuracy of service abnormality diagnosis.

In the meantime, when an abnormality such as a server error occurs, a processing of returning a response immediately (or a processing that takes a long time to return a response) increases, and the response time tends to fluctuate compared to that in a normal state. Using this tendency, the abnormality diagnosis device 101 focuses on the response message of a peak size which is extracted as the abnormal peak size, and determines that the service is abnormal when there is a fluctuation in the response time of the response message.

As a result, it becomes possible to diagnose an abnormality at the time of a failure such as service unavailability from the message size and the response time of the response message even in the case of encrypted communication without modifying a system that provides the service.

(Hardware Configuration Example of Abnormality Diagnosis Device 101)

Next, a hardware configuration example of the abnormality diagnosis device 101 will be described.

Figure 3:
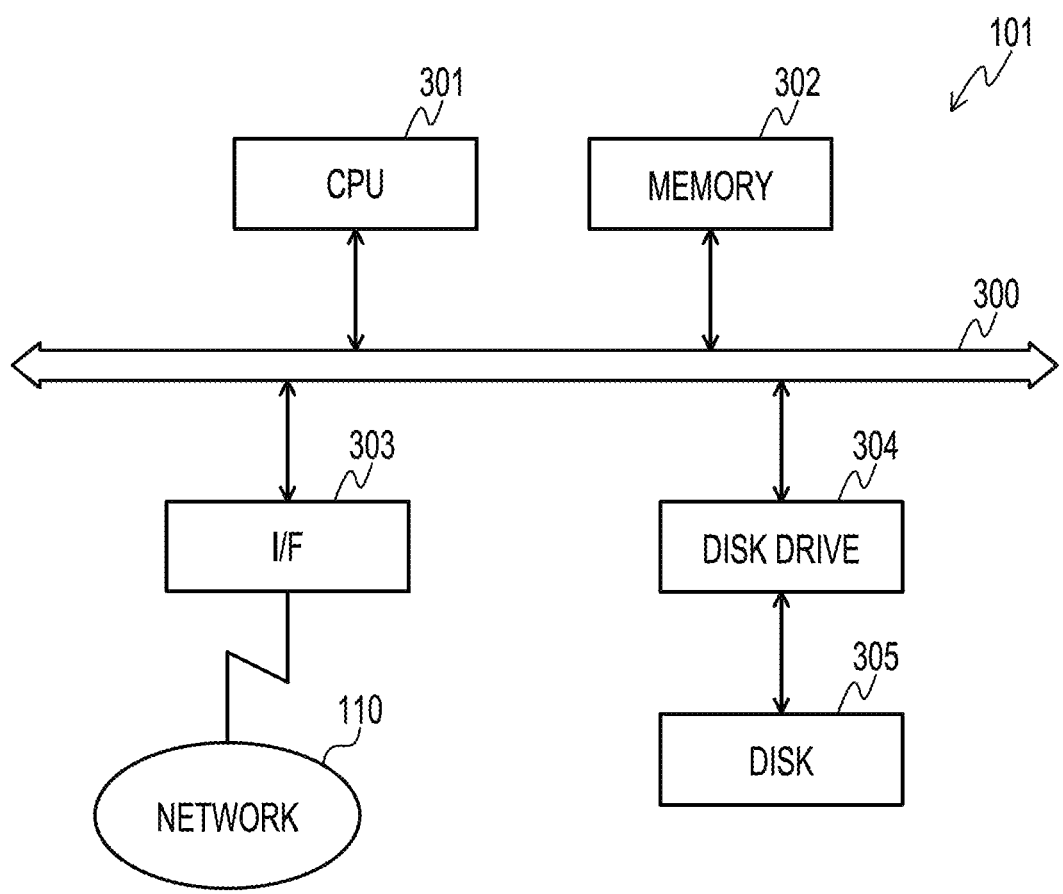
FIG. 3 is a block diagram illustrating a hardware configuration example of an abnormality diagnosis device 101.

FIG. 3 is a block diagram illustrating a hardware configuration example of the abnormality diagnosis device 101. In FIG. 3, the abnormality diagnosis device 101 includes a central processing unit (CPU) 301, a memory 302, an interface (I/F) 303, a disk drive 304, and a disk 305. Also, the respective components are connected to each other by a bus 300.

Here, the CPU 301 is in charge of the control of the entire abnormality diagnosis device 101. The CPU 301 may have a plurality of cores. The memory 302 includes, for example, a read only memory (ROM), a random access memory (RAM), a flash ROM, etc. Specifically, for example, the flash ROM or the ROM stores various programs, and the RAM is used as a work area of the CPU 301. The program stored in the memory 302 is loaded onto the CPU 301 so as to cause the CPU 301 to execute a coded processing.

The I/F 303 is connected to the network 110 through a communication line, and is connected to other devices (e.g., the management device 106, the network switch 107, etc.) through the network 110. Then, the I/F 303 is in charge of an interface between the network 110 and the inside of the device, and controls input/output of data from an external computer. The I/F 303 may employ, for example, a modem, a LAN adapter, or the like.

The disk drive 304 controls reading and writing of data from/on the disk 305 according to the control of the CPU 301. The disk 305 stores data written under the control of the disk drive 304. Examples of the disk 305 include a magnetic disk, an optical disk, and the like.

Further, the abnormality diagnosis device 101 may include, for example, a solid state drive (SSD), an input device, a display, and the like in addition to the above-described components. Also, the web server 102, the AP server 103, the DB server 104, the client device 105, the management device 106, and the network switch 107 illustrated in FIG. 1 may be implemented by the same hardware configuration as that of the abnormality diagnosis device 101. However, the client device 105 and the management device 106 include, for example, an input device, a display, and the like.

(Storage Contents of Message Data DB 120)

Next, descriptions will be made on the storage contents of the message data DB 120 that the abnormality diagnosis device 101 has. The message data DB 120 is implemented by, for example, a storage device such as the memory 302 and the disk 305 of the abnormality diagnosis device 101 illustrated in FIG. 3.

Figure 4:
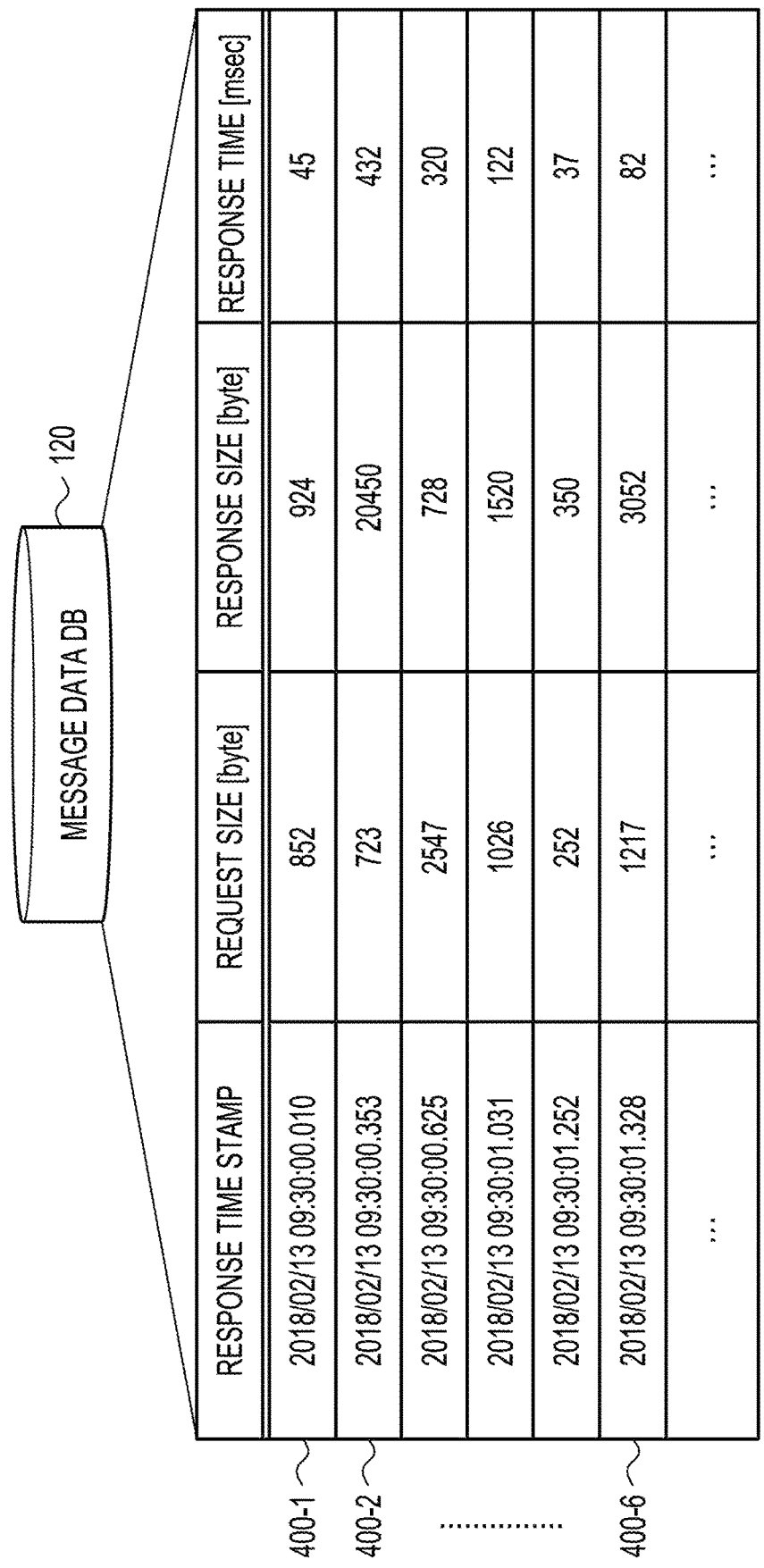
FIG. 4 is an explanatory diagram illustrating an example of storage contents of a message data DB 120.

FIG. 4 is an explanatory diagram illustrating an example of storage contents of the message data DB 120. In FIG. 4, the message data DB 120 has fields of a response time stamp, a request size, a response size, and a response time, and stores the message data (message data 400-1 to 400-6) as a record by setting information in each field.

Here, the response time stamp indicates the acquisition time of the response message. The acquisition time of the response message is the time when the abnormality diagnosis device 101 acquires a packet mirrored by the network switch 107 (the packet of the response message). The acquisition time of the response message corresponds to the date and time when the response message is transmitted from the web server 102 to the client device 105, or the date and time when the response message is received by the client device 105.

The request size represents the size of the request message (unit: byte). The response size represents the size of the response message (unit: byte). The response time is the time until a response message is returned to the request message. That is, the response time corresponds to an interval between the acquisition time of a set of request messages and the acquisition time of the response message.

Further, although not illustrated, the message data may include, for example, a client IP address, a client port number, a server IP address, a server port number, a transport layer protocol, and the like. The client IP address is an IP address of the client device 105 that has transmitted the request message. The client port number is a port number of the client device 105 that has transmitted the request message. The server IP address is an IP address of the server that has transmitted the response message (e.g., the web server 102). The server port number is a port number of the server that has transmitted the response message. The transport layer protocol indicates a protocol of the transport layer used for communication. For example, the service used by the user of the client device 105 may be identified from a combination of the server IP address and the server port number.

(Storage Contents of Normal Peak Size Data 130)

Next, descriptions will be made on the storage contents of the normal peak size data 130 that the abnormality diagnosis device 101 has. The normal peak size data 130 is stored in, for example, a storage device such as the memory 302 and the disk 305 of the abnormality diagnosis device 101.

Figure 5:
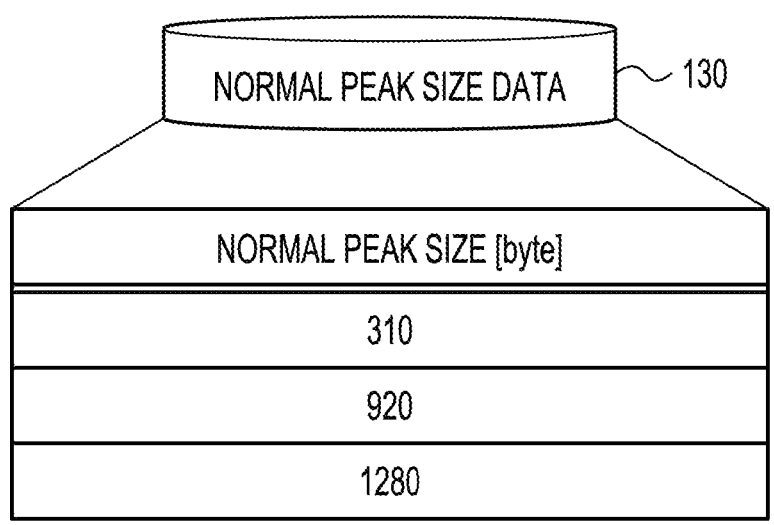
FIG. 5 is an explanatory diagram illustrating an example of storage contents of normal peak size data 130.

FIG. 5 is an explanatory view of an example of the storage contents of the normal peak size data 130. In FIG. 5, the normal peak size data 130 stores a normal peak size (unit: byte). Here, the normal peak size indicates the peak size of the response message in a normal state (when no failure occurs in the service).

The normal peak size may be obtained, for example, by collecting packets when no failure occurs in the service to be diagnosed, and obtaining a peak size which appear in the response size frequency distribution of the response message identified from the collected packet group. Also, the normal peak size corresponds to a class of a predetermined size width. For example, the normal peak size "310" corresponds to the classes "305 to 315."

Further, the normal peak size data 130 is provided, for example, for each service to be diagnosed. Specifically, for example, the normal peak size data 130 is stored in a storage device such as the memory 302 or the disk 305 in association with the information that identifies the service to be diagnosed. The information that identifies the service to be diagnosed is, for example, a combination of a server IP address and a server port number.

(Storage Contents of Normal Response Time Distribution DB 140)

Next, descriptions will be made on the storage contents of the normal response time distribution DB140 which the abnormality diagnosis device 101 has. The normal response time distribution DB 140 is implemented by, for example, a storage device such as the memory 302 and the disk 305 of the abnormality diagnosis device 101.

Figure 6:
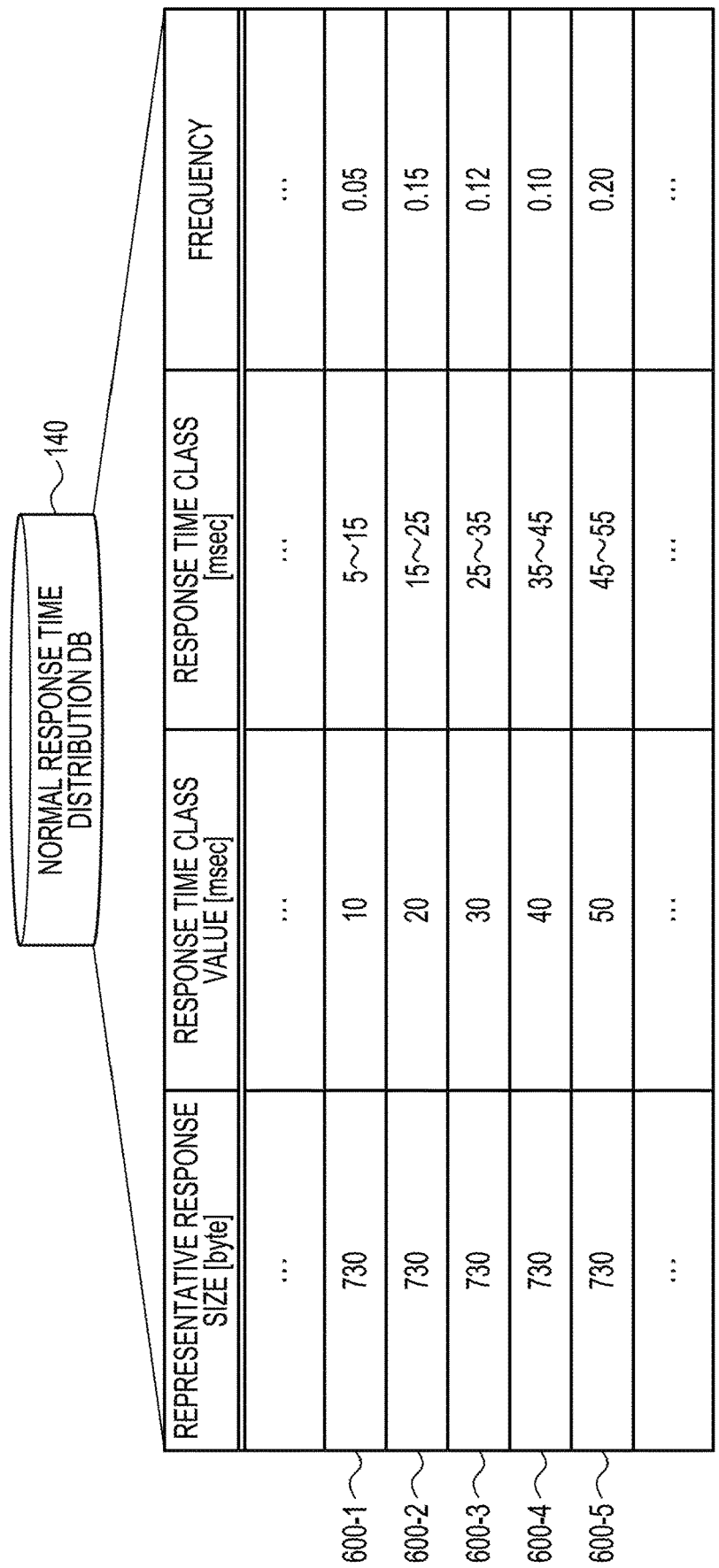
FIG. 6 is an explanatory diagram illustrating an example of storage contents of a normal response time distribution DB 140.

FIG. 6 is an explanatory diagram illustrating an example of storage contents of the normal response time distribution DB 140. In FIG. 6, the normal response time distribution DB 140 has fields of a representative response size, a response time class value, a response time class, and a frequency, and stores the normal response time distribution data (e.g., the normal response time distribution data 600-1 to 600-5) as a record by setting information in each field.

The representative response size indicates a representative value of the response size classes divided by a predetermined size width (unit: byte). Here, it is assumed that the predetermined size width is "10." For example, the representative response size of "730" indicates the representative value of the response size classes of "725 to 735."

The class value of the response time indicates a representative value of the response time classes divided by a predetermined time width (unit: msec). The response time class indicates the class of the response time divided by a predetermined time width. Here, it is assumed that the predetermined time width is "10." For example, the response time class value of "10" indicates a representative value of the response time classes of "5 to 15." The frequency indicates a ratio (relative frequency) of the number (frequency) of response messages of each class to the total number of response messages.

For example, the normal response time distribution data 600-1 indicates the frequency of "0.05" of the response time classes of "5 to 15" for the response message having response sizes of "725 to 735."

Further, the normal response time distribution DB 140 is provided, for example, for each service to be diagnosed. Specifically, for example, the normal response time distribution DB 140 is held in a storage device such as the memory 302 or the disk 305 in association with the information that identifies the service to be diagnosed.

(Functional Configuration Example of Abnormality Diagnosis Device 101)

Figure 7:
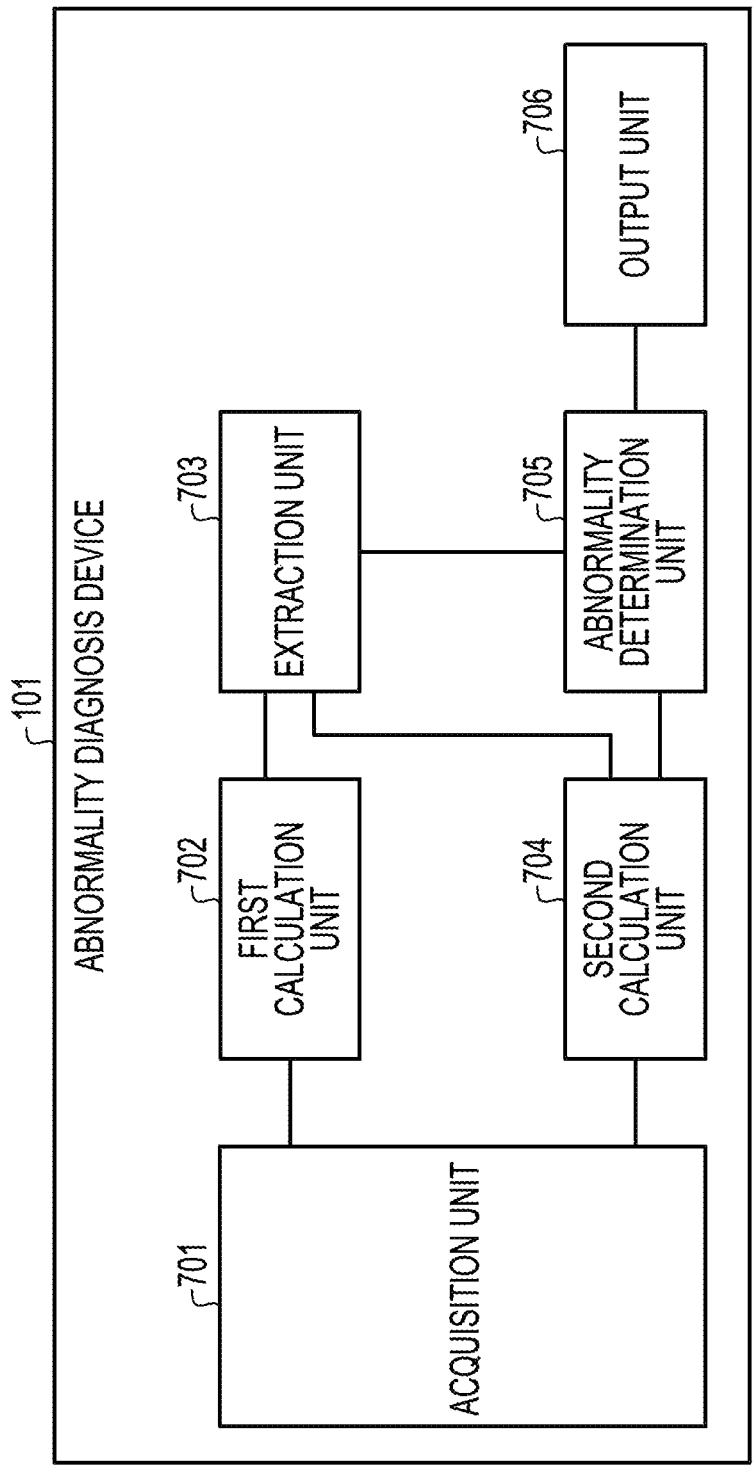
FIG. 7 is a block diagram illustrating a functional configuration example of an abnormality diagnosis device 101.

FIG. 7 is a block diagram illustrating a functional configuration example of the abnormality diagnosis device 101. In FIG. 7, the abnormality diagnosis device 101 includes an acquisition unit 701, a first calculation unit 702, an extraction unit 703, a second calculation unit 704, an abnormality determination unit 705, and an output unit 706. The acquisition unit 701 to the output unit 706 function as controllers, and more specifically, these units implement the function by causing the CPU 301 to execute a program stored in a storage device such as the memory 302 or the disk 305 illustrated in FIG. 3, or by the I/F 303. The processing result of each functional unit is stored in, for example, a storage device such as the memory 302 or the disk 305.

The acquisition unit 701 acquires message data. Here, the message data is information that indicates the message size and the response time of the response message. The message data may be generated, for example, in the abnormality diagnosis device 101. In this case, the acquisition unit 701 acquires the message data generated in an own device.

Specifically, for example, the abnormality diagnosis device 101 captures the packets which are transmitted and received between the client device 105 and the web server 102 via the network switch 107. The captured packets (data packets) are accumulated in a storage device such as, for example, the memory 302 and the disk 305. The packets may be packets in which the data portions are encrypted.

Next, the abnormality diagnosis device 101 reads out the accumulated packet group. At this time, the abnormality diagnosis device 101 may read out the packet group which is transmitted and received within a predetermined period T. The predetermined period T is a target period in which a service abnormality diagnosis is performed, and is, for example, a period of about 5 minutes to 10 minutes. Then, the abnormality diagnosis device 101 analyzes the read packet group and reconstructs a message. Further, a message analysis processing of analyzing the packet and reconstructing the message will not be described here because the processing is a known technique.

Next, the abnormality diagnosis device 101 identifies a pair (set) of the request message and the response message. The request message is a message which is transmitted from the client device 105 to the web server 102. The response message is a message which is transmitted from the web server 102 to the client device 105.

The response message paired with the request message is a message which is reconstructed by the packet captured next to the packet of the request message. Also, a request source (client) and a request destination (server) are common to the request message.

Then, the abnormality diagnosis device 101 calculates a response time until a response message is returned in response to the identified request message. The response time is measured, for example, from a time interval when the communication direction of the packet in the same connection changes (data packet) from upstream (from the client to the server) to downstream (from the server to the client).

In addition, the specific processing contents for measuring the response time of the response message may be referred to by, for example, Japanese Laid-Open Patent Publication No. 2016-146588. Further, even when the communication is encrypted, since the information other than the data portion (header portion) may be referred to, the request source information (e.g., the IP address and the port number of the client) and the request destination information (e.g., the IP address and the port number of the server) may be identified.

As a result, the message data that indicates the message size and the response time of the response message may be generated. Further, the message size of each message (the request message, the response message) is represented by the sum of the sizes of packets which form each message.

Here, the acquisition unit 701 may be configured to acquire the message data from an external computer. Alternatively, the acquisition unit 701 may be configured to acquire the message data by a user's operation input using an input device (not illustrated).

The acquired message data is stored in, for example, the message data DB 120 illustrated in FIG. 4. The message data may be configured to include, for example, a client IP address, a client port number, a server IP address, a server port number, a transport layer protocol, and the like.

The first calculation unit 702 calculates a response size frequency distribution based on the acquired message data. Here, the response size frequency distribution is a frequency distribution of message sizes of response messages.

Specifically, for example, the first calculation unit 702 acquires, from the message data DB 120, the message data whose response time stamp is included in the predetermined period T. Next, based on the acquired message data, the first calculation unit 702 calculates, for each of the classes divided by a predetermined size width (class width), the frequency of the response message to which the message size belongs to the class.

More specifically, for example, the first calculation unit 702 counts the frequency of response messages to which the message size belongs to each class. Then, the first calculation unit 702 calculates the frequency of each class (relative frequency) by dividing the counted frequency of each class by the total number of response messages. The total number of response messages corresponds to the total number of pieces of the acquired message data.

In this way, it is possible to calculate, for each message size class, a response size frequency distribution that indicates how often response messages of the class appear with respect to the total number of response messages.

Further, the message data DB 120 may store message data for a plurality of services. In this case, the first calculation unit 702 acquires message data on the service to be diagnosed. The message data of the service to be diagnosed is identified from, for example, the server IP address and the server port number.

The calculated response size frequency distribution is stored in, for example, a response size frequency distribution table 800 as illustrated in FIG. 8. The response size frequency distribution table 800 is stored in, for example, a storage device such as the memory 302 and the disk 305.

FIG. 8 is an explanatory diagram of an example of the storage contents of the response size frequency distribution table 800. In FIG. 8, the response size frequency distribution table 800 has fields for "class value," "class," and "frequency," and stores the response size distribution data (e.g., the response size distribution data 800-1 to 800-5) as a record by setting information in each field.

Here, the "class value" is a representative value of the response size class (unit: byte). The "class" is a class of the response size (unit: byte). The "frequency" is a frequency of the response size class (relative frequency). For example, the response size distribution data 800-1 indicates the class value of "710," the classes of "705 to 715," and the frequency of "0.06" of the response size.

Further, the first calculation unit 702 may be configured to calculate a response size frequency distribution based on the message data that indicates the message size and the response time of the response message having a response size which is equal to or less than a predetermined size among the acquired message data. The predetermined size may be arbitrarily set, and is set in consideration of a possible range of the message size of the response message delivered when an abnormality such as a server error occurs. The predetermined size is set to, for example, a size of about 1500 [bytes].

The extraction unit 703 identifies a peak size that satisfies the first condition from the calculated response size frequency distribution. Then, the extraction unit 703 extracts a peak size different from the normal peak size among the peak sizes that satisfy the identified first condition. The normal peak size is the peak size of the response in a normal state stored in advance.

In the following description, among the peak sizes that satisfy the first condition, a peak size different from the normal peak size may be referred to as an "abnormal peak size."

Specifically, the extraction unit 703 refers to, for example, the response size frequency distribution table 800 illustrated in FIG. 8 so as to identify, as the peak size that satisfies the first condition, the class value (representative value) of a class whose difference in frequency with adjacent classes is equal to or more than the threshold α.

Taking the response size distribution data 800-3 in the response size frequency distribution table 800 as an example, the frequency is "0.12." Further, the frequencies of adjacent classes are "0.08" and "0.07." Further, the threshold α is set to "α=0.04." The difference between the frequency of "0.12" and the frequency of "0.08" of the adjacent class is "0.04=0.12-0.08." The difference between the frequency of "0.12" and the frequency of "0.07" of the adjacent class is "0.05=0.12-0.07." The differences of "0.08" and "0.07" are both equal to or more than the threshold α. Therefore, the extraction unit 703 identifies the class value of "730" of the response size distribution data 800-3 as a peak size that satisfies the first condition.

Next, the extraction unit 703 refers to the normal peak size data 130 illustrated in FIG. 5 and extracts, as an abnormal peak size, a peak size different from the normal peak size among the identified peak sizes. Further, when the normal peak size data 130 is provided for each service, the extraction unit 703 refers to the normal peak size data 130 corresponding to the service to be diagnosed.

For example, the identified peak size is set to "730." The peak size of "730" does not match any of the normal peak sizes of the normal peak size data 130. Therefore, the extraction unit 703 extracts the identified peak size of "730" as an abnormal peak size. Further, a more specific example of extracting the abnormal peak size will be described later with reference to FIG. 13.

The extracted abnormal peak size is stored in, for example, an abnormal peak size table 900 as illustrated in FIG. 9. The abnormal peak size table 900 is stored in, for example, a storage device such as the memory 302 and the disk 305.

FIG. 9 is an explanatory diagram of an example of the storage contents of the abnormal peak size table 900. In FIG. 9, the abnormal peak size table 900 has fields for "date and time" and "abnormal peak size," and stores the abnormal peak size information (e.g., abnormal peak size information 900-1 to 900-6) as a record by setting information in each field.

Here, the "date and time" is a target date and time when a service abnormality diagnosis is performed, and is, for example, the date and time of the head of the predetermined period T. The "abnormal peak size" is the extracted abnormal peak size. Further, the term "NA" indicates that an abnormal peak size is not extracted. For example, the abnormal peak size information 900-1 indicates the date and time of "2018/02/13 09:00:00" and the abnormal peak size of "80."

The second calculation unit 704 calculates a response time frequency distribution of the response message of the extracted abnormal peak size based on the acquired message data. Here, the response time frequency distribution is a frequency distribution of response times of response messages.

Specifically, for example, the second calculation unit 704 acquires, from the message data DB 120, the message data in which a response time stamp is included in the predetermined period T. Next, the second calculation unit 704 refers to the abnormal peak size table 900 so as to select an abnormal peak size corresponding to the predetermined period T.

For example, when the predetermined period T is "2018/02/13 09:00:00 to 2018/02/13 09:10:00," the second calculation unit 704 selects the abnormal peak size of "80" of the abnormal peak size information 900-1. Next, the second calculation unit 704 extracts the message data whose response size corresponds to the selected abnormal peak size from the acquired message data.

For example, when the abnormal peak size is "80," the message data having response sizes of "75 to 85" is extracted. Then, based on the extracted message data, the second calculation unit 704 calculates, for each of the classes divided by a predetermined time width (class width), the frequency of the response message to which the response time belongs in the class.

More specifically, for example, the second calculation unit 704 counts the frequency of response messages to which the response time belongs in each class. Then, the second calculation unit 704 calculates the frequency (relative frequency) of each class by dividing the counted frequency of each class by the total number of response messages. The total number of response messages corresponds to the total number of the extracted message data.

Thus, for each class of response times, it is possible to calculate a response time frequency distribution that indicates how often the response messages of the class appear with respect to the total number of response messages. Further, the message data DB 120 may store message data for a plurality of services. In this case, the second calculation unit 704 acquires the message data for the service to be diagnosed.

The calculated response time frequency distribution is stored in, for example, a response time frequency distribution table 1000 as illustrated in FIG. 10. The response time frequency distribution table 1000 is stored in, for example, a storage device such as the memory 302 and the disk 305.

FIG. 10 is an explanatory diagram illustrating an example of storage contents of the response time frequency distribution table 1000. In FIG. 10, the response time frequency distribution table 1000 has fields for "representative response size," "class value," "class," and "frequency," and stores the response time distribution data (e.g., response time distribution data 1000-1 to 1000-5) as a record by setting information in each field.

Here, the "representative response size" is a representative value of the class to which the abnormal peak size belongs. That is, the representative value of the class to which the selected abnormal peak size belongs is set in the representative response size field. The "class value" is a representative value of the response time class (unit: msec). The "class" is the class of the response time (unit: msec). The "frequency" is the frequency (relative frequency) of the response time class.

For example, the response time distribution data 1000-1 indicates a representative response size of "730," a class value of response time of "10," classes of "5 to 15," and a frequency of "0.04."

In addition, the second calculation unit 704 may be configured to calculate the response time frequency distribution of the response message of the abnormal peak size based on the message data that indicate the message size and the response time of the response message whose response time is equal to or less than a predetermined time among the acquired message data. The predetermined time may be set arbitrarily, and is set in consideration of the possible range of response times of response messages delivered when an abnormality such as a server error occurs. The predetermined time is set to, for example, about 100 to 500 [msec].

The abnormality determination unit 705 determines whether the calculated response time frequency distribution of the response message of the abnormal peak size satisfies the second condition. Here, the second condition is set to, for example, a condition that the response time frequency distribution of the response message of the abnormal peak size is statistically different from the response time frequency distribution of the response message in a normal state.

Further, when it is determined that the second condition is satisfied, the abnormality determination unit 705 determines that the service is abnormal. Meanwhile, when it is determined that the second condition is not satisfied, the abnormality determination unit 705 determines that the service is normal. In addition, when the extraction unit 703 does not extract an abnormal peak size, the abnormality determination unit 705 determines that the service is normal.

Specifically, for example, the abnormality determination unit 705 first extracts the normal response time distribution data of a representative response size corresponding to the selected abnormal peak size from the normal response time distribution DB 140 illustrated in FIG. 6. Further, when the normal response time distribution DB 140 is provided for each service, the abnormality determination unit 705 refers to the normal response time distribution DB 140 corresponding to the service to be diagnosed.

This makes it possible to identify the response time frequency distribution of the response message in a normal state for the response message having the same response size as the abnormal peak size.

Next, the abnormality determination unit 705 refers to, for example, the response time frequency distribution table 1000 illustrated in FIG. 10 and tests whether the response time frequency distribution of the response message of the abnormal peak size is statistically different from the response time frequency distribution of the response message in a normal state so as to determine whether there is a fluctuation in response time.

Then, when it is determined that there is a fluctuation in response time, the abnormality determination unit 705 determines that the second condition is satisfied. Meanwhile, when it is determined that there is no fluctuation in response time, the abnormality determination unit 705 determines that the second condition is not satisfied. Further, for example, the Kolmogorov-Smirnov test, which is a nonparametric method applicable regardless of the form of distribution, may be used as the testing method.

In addition, the abnormality determination unit 705 may be configured to determine the similarity of the response time frequency distribution from the statistical value of each response time frequency distribution (the response time frequency distribution of the response message of the abnormal peak size, the response time frequency distribution of the response message in a normal state). The statistical value of each response time frequency distribution is, for example, a mean value of response times, a standard deviation, a variance, or the like.

In this case, when it is determined that the response time frequency distribution has no similarity, the abnormality determination unit 705 determines that the second condition is satisfied. Meanwhile, when it is determined that the response time frequency distribution has a similarity, the abnormality determination unit 705 determines that the second condition is not satisfied.

More specifically, for example, the abnormality determination unit 705 may be configured to calculate the statistical value of each response time frequency distribution using the following equation (1). However, the symbol "$r_{mean}$" refers to a mean value of response times. The symbol "$r_i$" refers to a class value of the i-$^{th}$ response time of the class (unit: msec). The symbol "i" is numbered from the lower class value. The symbol "$c_i$" refers to the i-$^{th}$ frequency of the class (relative frequency). The symbol "N" refers to the total number of classes.

[Equation 1]

$$\gamma_{mean} = \sum_{i=1}^{n} \gamma_i C_i \quad (1)$$

In addition, for example, when a difference between the statistical values of the respective response time frequency distributions is equal to or more than a threshold β, the abnormality determination unit 705 determines that the response time frequency distribution has no similarity. The threshold β may be set arbitrarily. Here, the threshold β is set to "β=10 [msec]." Further, the statistical value of the response time frequency distribution of the response message of the abnormal peak size is "45 [msec]," and the statistical value of the response time frequency distribution of the response message in a normal state is "72 [msec]." In this case, the difference between the statistical values of the respective response time frequency distributions is "27 [msec]," which is equal to or more than the threshold β. Therefore, the abnormality determination unit 705 determines that the response time frequency distribution has no similarity.

In addition, an example of determining the abnormality of the service to be diagnosed will be described later with reference to FIG. 14. The determined determination result is stored in, for example, the abnormality diagnosis result table 1100 as illustrated in FIG. 11. The abnormality diagnosis result table 1100 is stored in, for example, a storage device such as the memory 302 and the disk 305.

FIG. 11 is an explanatory diagram illustrating an example of storage contents of the abnormality diagnosis result table 1100. In FIG. 11, the abnormality diagnosis result table 1100 has fields for "date and time" and "diagnosis result," and stores the diagnosis result information (e.g., diagnosis result information 1100-1 to 1100-6) as a record by setting information in each field.

Here, the "date and time" is a target date and time in which the service abnormality diagnosis is performed, and is, for example, the date and time of the head of the predetermined period T. The diagnosis result is a diagnosis result that indicates whether the service is abnormal or normal. For example, the diagnosis result information 1100-1 indicates the date and time of "2018/02/13 09:00:00" and the diagnosis result of "normal."

Further, the abnormality diagnosis result table 1100 is set, for example, for each service to be diagnosed.

The output unit 706 outputs the determination result determined by the abnormality determination unit 705. Specifically, for example, when it is determined that the service is abnormal, the output unit 706 outputs an abnormality diagnosis result that indicates an abnormality of the service. Meanwhile, when the service is determined to be normal, the output unit 706 outputs an abnormality diagnosis result that indicates that the service is normal.

Examples of the output format of the output unit 706 include storage in a storage device such as the memory 302 or the disk 305, transmission to another computer by the I/F 303, displaying on a display (not illustrated), printing on a printer (not illustrated), and the like.

More specifically, for example, the output unit 706 transmits diagnosis result information of a service to be diagnosed to the management device 106 illustrated in FIG. 1 by referring to the abnormality diagnosis result table 1100 illustrated in FIG. 11. The diagnosis result information includes, for example, information that identifies a service to be diagnosed.

Figure 12:
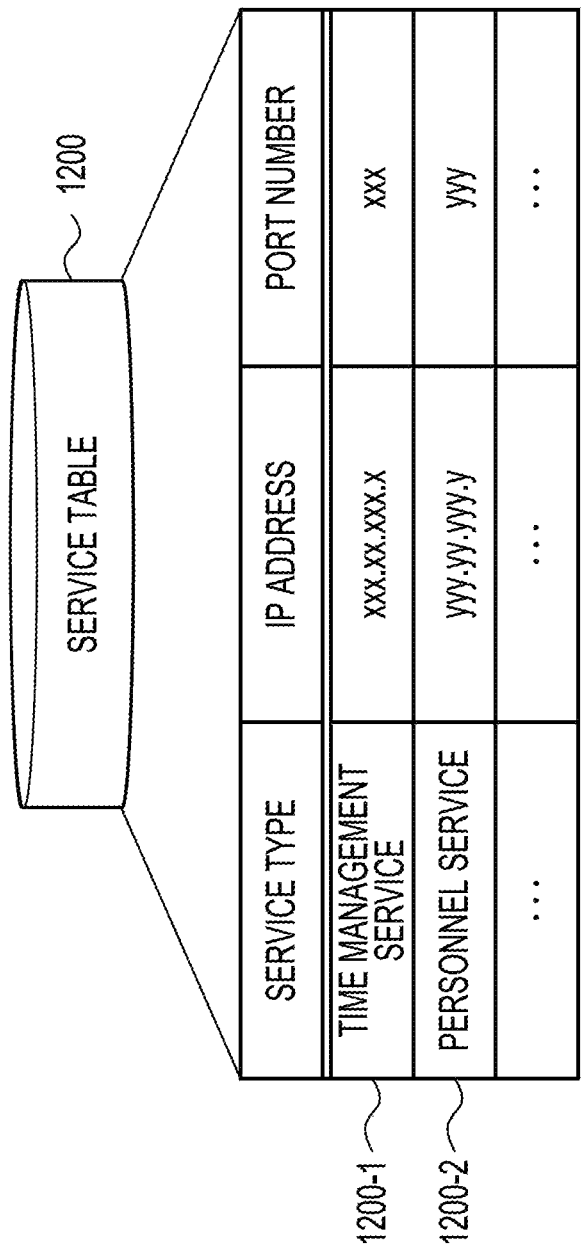
FIG. 12 is an explanatory diagram illustrating an example of storage contents in a service table 1200.

The information that identifies the service to be diagnosed is, for example, the type of service. The type of service may be identified from, for example, a service table 1200 as illustrated in FIG. 12. The service table 1200 is stored in, for example, a storage device such as the memory 302 and the disk 305.

FIG. 12 is an explanatory diagram illustrating an example of storage contents in the service table 1200. In FIG. 12, the service table 1200 has fields of "service type," "IP address," and a "port number," and stores the service information (e.g., service information 1200-1 and 1200-2) as a record by setting information in each field.

Here, the "service type" is a type of service to be diagnosed. The "IP address" and the "port number" refer to the IP address and the port number of a server that provides the service to be diagnosed (e.g., the web server 102). For example, the service information 1200-1 indicates a service type of "time management service," an IP address of "xxx.xx.xxx.x," and a port number of "xxx".

According to the service table 1200, for example, the service type of the service to be diagnosed may be identified from the server IP address and the server port number that are included in the message data used for the abnormality diagnosis.

When the diagnosis result information is transmitted from the abnormality diagnosis device 101 to the management device 106, the management device 106 displays an abnormality diagnosis result screen. The abnormality diagnosis result screen is a screen that displays an abnormality diagnosis result of the service to be diagnosed. An exemplary screen of the abnormality diagnosis result screen will be described later with reference to FIGS. 15 and 16.

(Extraction Example of Abnormal Peak Size)

Next, an example of extracting an abnormal peak size will be described with reference to FIG. 13.

Figure 13:
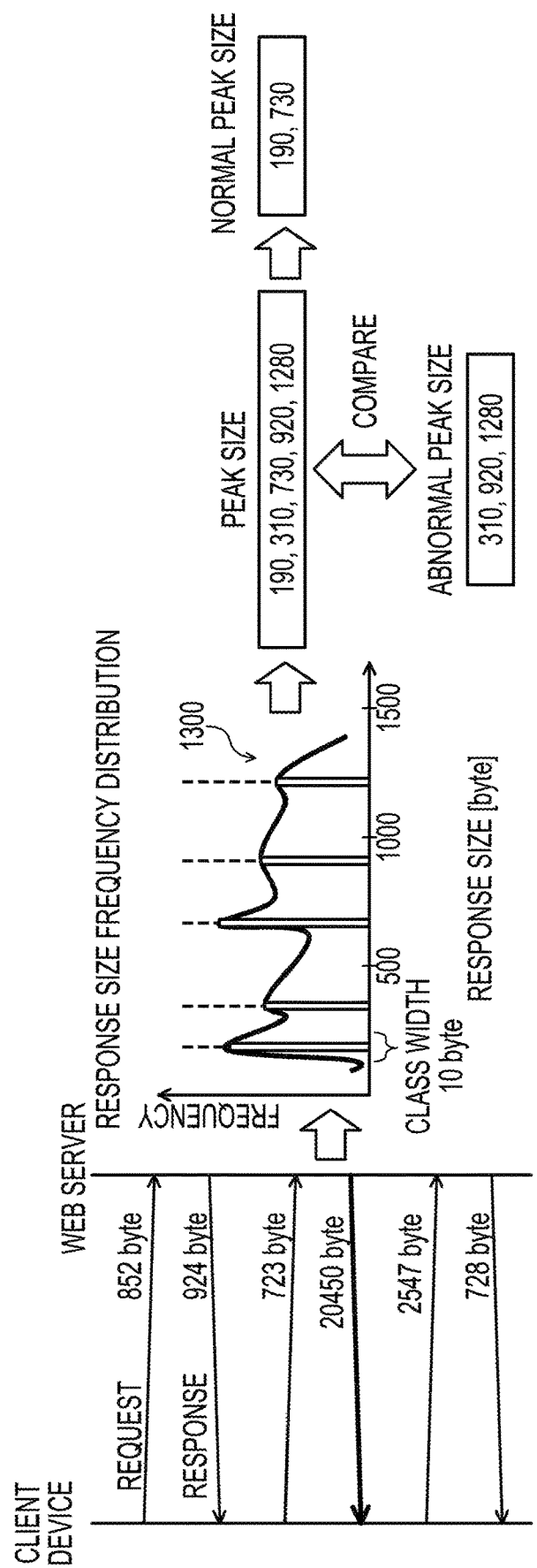
FIG. 13 is an explanatory diagram illustrating an example of extracting an abnormal peak size.

FIG. 13 is an explanatory diagram illustrating an example of extracting an abnormal peak size. In FIG. 13, a response size frequency distribution 1300 refers to a frequency distribution of message sizes of response messages delivered within a predetermined period T between the client device 105 and the web server 102.

In this case, the extraction unit 703 identifies, from the response size frequency distribution 1300, a peak size that satisfies the first condition. Here, it is assumed that the peak sizes of "190, 310, 730, 920, 1280" that satisfy the first condition are identified. Next, the extraction unit 703 refers to the normal peak size data 130 and extracts, as an abnormal peak size, a peak size different from the normal peak size among the identified peak sizes.

Here, the normal peak sizes are "310, 920, 1280." Therefore, the peak sizes of "190, 730" which are different from the normal peak sizes of "310, 920, 1280" among the peak sizes of "190, 310, 730, 920, 1280" are extracted as abnormal peak sizes.

(Example of Determining Abnormality of Service to be Diagnosed)

Next, with reference to FIG. 14, descriptions will be made on an example of determining the abnormality of a service to be diagnosed. Here, as illustrated in FIG. 13, it is assumed that the abnormal peak sizes of "190, 730" are extracted.

Figure 14:
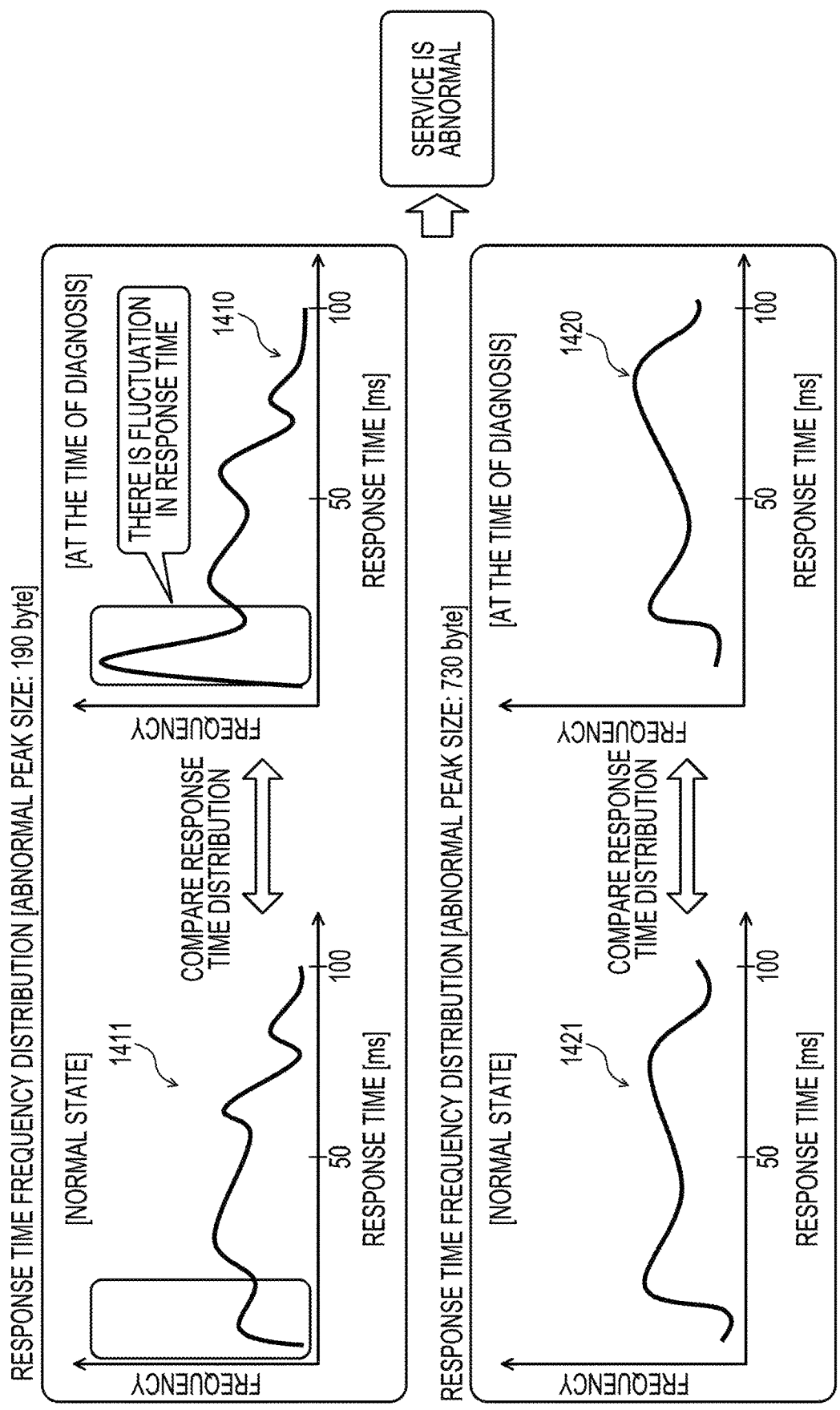
FIG. 14 is an explanatory diagram illustrating an example of determining an abnormality in a service to be diagnosed.

FIG. 14 is an explanatory diagram illustrating an example of determining the abnormality in a service to be diagnosed. In FIG. 14, a response time frequency distribution 1410 is a frequency distribution of response times of response messages of the abnormal peak size of "190." A response time frequency distribution 1420 is a frequency distribution of response times of response messages of the abnormal peak size of "730."

In this case, the abnormality determination unit 705 determines whether the response time frequency distributions 1410 and 1420 of the respective abnormal peak sizes of "190, 730" satisfy the second condition. Specifically, for example, the abnormality determination unit 705 identifies, from the normal response time distribution DB 140, a response time frequency distribution 1411 of the response message in a normal state corresponding to the abnormal peak size of "190."

Next, the abnormality determination unit 705 tests whether the response time frequency distribution 1410 of the abnormal peak size of "190" is statistically different from the response time frequency distribution 1411 of the response message in a normal state so as to determine whether there is a fluctuation in response time. Here, a case is assumed where it is determined that there is a fluctuation in response time. In this case, the abnormality determination unit 705 determines that the response time frequency distribution 1410 of the abnormal peak size of "190" satisfies the second condition.

In addition, the abnormality determination unit 705 identifies, from the normal response time distribution DB 140, a response time frequency distribution 1421 of the response message in a normal state corresponding to the abnormal peak size of "730." Next, the abnormality determination unit 705 tests whether the response time frequency distribution 1420 of the abnormal peak size of "730" is statistically different from the response time frequency distribution 1421 of the response message in a normal state so as to determine whether there is a fluctuation in response time. Here, it is assumed that it is determined that there is a fluctuation in response time. In this case, the abnormality determination unit 705 determines that the response time frequency distribution 1420 of the abnormal peak size of "730" does not satisfy the second condition.

Then, when it is determined that at least one of the response time frequency distributions 1410 and 1420 of the respective abnormal peak sizes of "190, 730" satisfies the second condition, the abnormality determination unit 705 determines that the service is abnormal. Here, since the response time frequency distribution 1410 of the abnormal peak size of "190" satisfies the second condition, it is determined that the service is abnormal.

(Screen Example of Abnormality Diagnosis Result Screen)

Next, with reference to FIGS. 15 and 16, descriptions will be made on a screen example of an abnormality diagnosis result screen displayed on the management device 106.

FIG. 15 is an explanatory diagram (part 1) illustrating a screen example of the abnormality diagnosis result screen. In FIG. 15, an abnormality diagnosis result screen 1500 is a screen that displays in time series notification messages 1501 to 1504 that indicate the abnormality diagnosis results of the service to be diagnosed.

The notification messages 1501 to 1505 include fields for "date and time," "service type," "status," and "occurrence period." The "date and time" refers to the date and time when the service diagnosis result information is received from the abnormality diagnosis device 101. The "service type" is a type of service. The "status" indicates the abnormality diagnosis result of the service. Here, the status is displayed only when the abnormality diagnosis result is "abnormal." The occurrence period is a period determined to be abnormal in the service, and represents a period in which a failure occurs in the service. The occurrence period corresponds to, for example, a predetermined period T based on the target date and time when the service abnormality diagnosis is performed.

According to the abnormality diagnosis result screen 1500, an administrator of the abnormality diagnosis system 100 may grasp, for each service to be diagnosed, a period in which a failure has occurred. For example, according to the notification messages 1501 and 1503, it may be grasped that a failure has occurred in the occurrence periods of "2019/02/13 09:20 to 09:30 on" and "2018/02/13 09:30 to 09:40" for the service of the service type "time management service."

Figure 16:
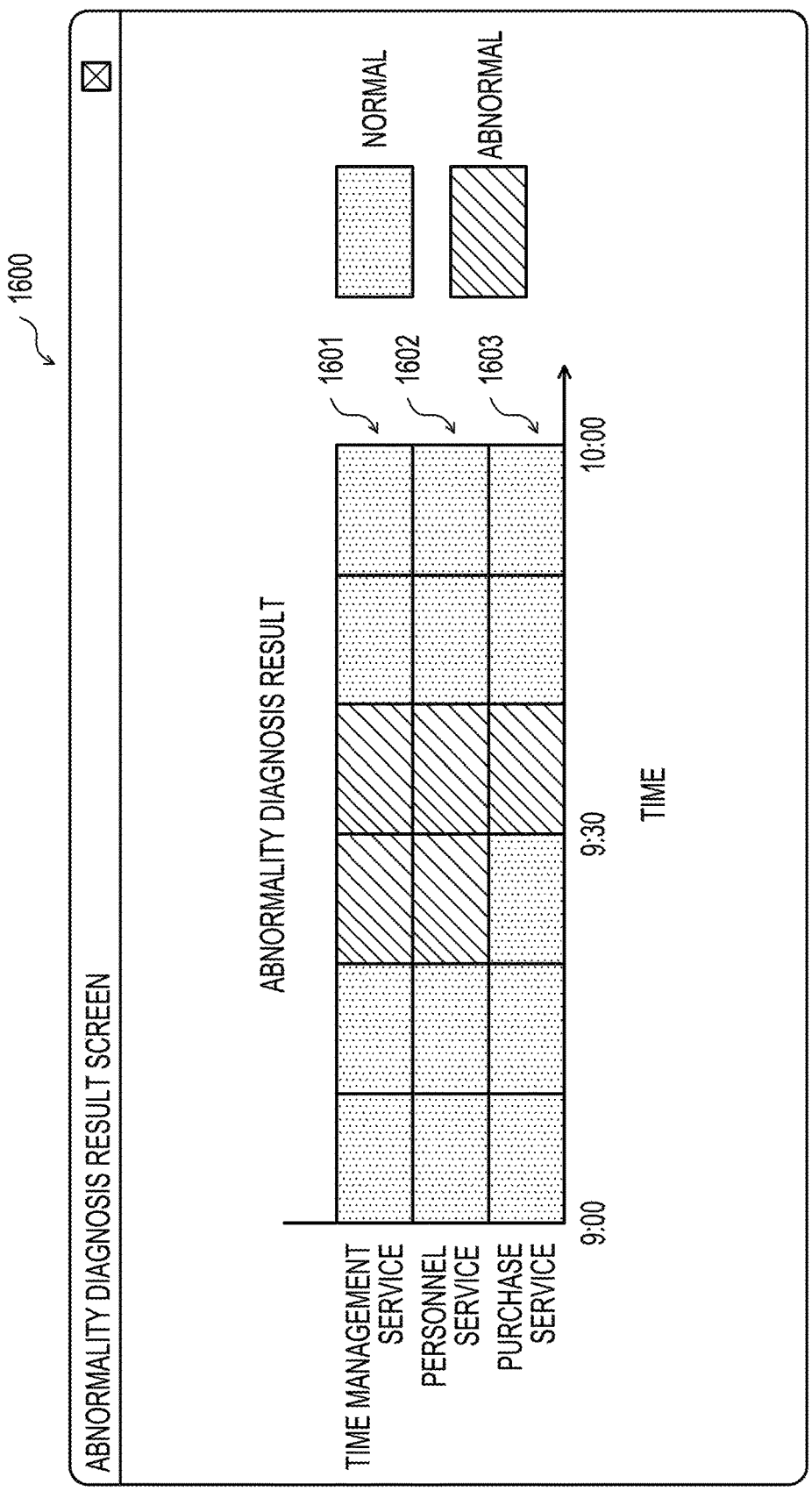
FIG. 16 is an explanatory diagram (part 2) illustrating a screen example of an abnormality diagnosis result screen.

FIG. 16 is an explanatory diagram (part 2) illustrating a screen example of the abnormality diagnosis result screen. In FIG. 16, an abnormality diagnosis result screen 1600 is a screen that displays the abnormality diagnosis result of the service to be diagnosed in the form of a graph. Specifically, band graphs 1601 to 1603 for each service to be diagnosed are displayed on the abnormality diagnosis result screen 1600. Each of the band graphs 1601 to 1603 represents the abnormality diagnosis result every 10 minutes of each service.

According to the abnormality diagnosis result screen 1600, an administrator of the abnormality diagnosis system 100 may intuitively grasp the abnormality diagnosis result of each service that changes with the passage of time (i.e., "normal" or "abnormal"). For example, according to the band graph 1601, it may be grasped that a failure has occurred in the period of "09:20 to 09:40" for the service of the service type of "time management service."

(Abnormality Diagnosis Processing Procedure of Abnormality Diagnosis Device 101)

Next, with reference to FIG. 17, descriptions will be made on an abnormality diagnosis processing procedure of the abnormality diagnosis device 101. The abnormality diagnosis processing of the abnormality diagnosis device 101 is executed, for example, for each service to be diagnosed every time a predetermined time elapses (10 minutes interval). Here, an abnormality diagnosis processing procedure in the case of focusing on a certain service will be described.

Figure 17:
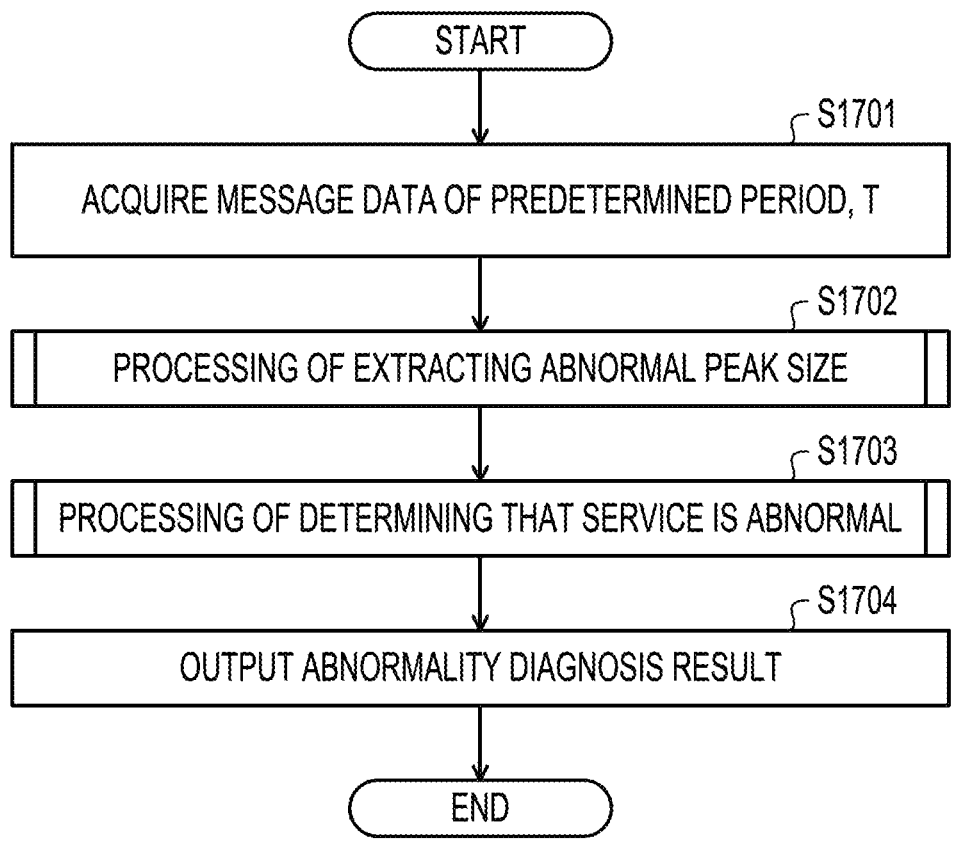
FIG. 17 is a flowchart illustrating an example of an abnormality diagnosis processing procedure of the abnormality diagnosis device 101.

FIG. 17 is a flowchart illustrating an example of an abnormality diagnosis processing procedure of the abnormality diagnosis device 101. In the flowchart of FIG. 17, the abnormality diagnosis device 101 first acquires the message data in which a response time stamp is included in a predetermined period T from the message data DB 120 (step S1701).

Next, the abnormality diagnosis device 101 executes an abnormal peak size extraction processing of extracting an abnormal peak size based on the acquired message data (step S1702). A specific processing procedure of the abnormal peak size extraction processing will be described later with reference to FIG. 18.

Next, the abnormality diagnosis device 101 executes a service abnormality determination processing of performing an abnormality diagnosis of the service to be diagnosed (step S1703). A specific processing procedure of the service abnormality determination processing will be described later with reference to FIGS. 19 and 20.

Then, the abnormality diagnosis device 101 outputs an abnormality diagnosis result of the service to be diagnosed that has been diagnosed in the service abnormality determination processing (step S1704), and ends a series of processes according to the flowchart. As a result, without analyzing the contents (data portion) of the packet, it is possible to perform an abnormality diagnosis of the service to be diagnosed and output the abnormality diagnosis result based on the response size and the response time of the response message.

Next, with reference to FIG. 18, descriptions will be made on a specific processing procedure of the abnormal peak size extraction processing in step S1702 illustrated in FIG. 17.

Figure 18:
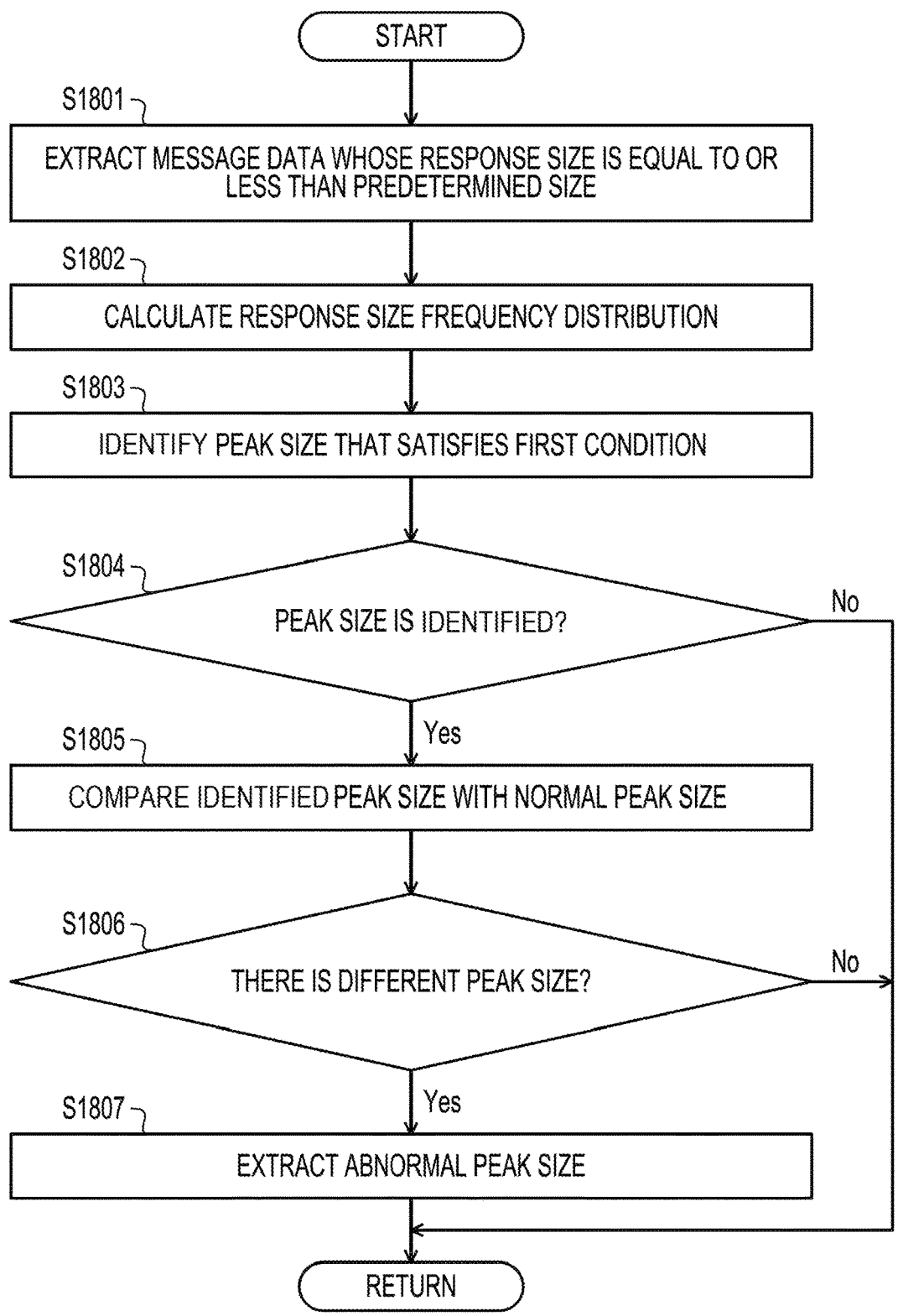
FIG. 18 is a flowchart illustrating an example of a specific processing procedure of an abnormal peak size extraction processing.

FIG. 18 is a flowchart illustrating an example of a specific processing procedure of the abnormal peak size extraction processing. In the flowchart of FIG. 18, the abnormality diagnosis device 101 first extracts the message data that has a response size equal to or less than a predetermined size from the message data acquired in step S1701 (step S1801).

Next, the abnormality diagnosis device 101 calculates a response size frequency distribution based on the extracted message data (step S1802). For example, the abnormality diagnosis device 101 calculates, for each of the classes divided by a predetermined size width (class width), the frequency of the response message to which the message size belongs in the relevant class.

Then, the abnormality diagnosis device 101 identifies a peak size that satisfies the first condition from the calculated response size frequency distribution (step S1803). For example, the abnormality diagnosis device 101 identifies a class value (representative value) of a class that has difference with the frequency of the adjacent class which is equal to or more than the threshold α, as a peak size that satisfies the first condition.

Next, the abnormality diagnosis device 101 determines whether a peak size that satisfies the first condition has been identified (step S1804). Here, when it is determined that the peak size that satisfies the first condition has not been identified ("No" in step S1804), the abnormality diagnosis device 101 returns to the step in which the abnormal peak size extraction processing has been called.

Meanwhile, when it is determined that the peak size satisfying the first condition has been identified ("Yes" in step S1804), the abnormality diagnosis device 101 compares the identified peak size with the normal peak size by referring to the normal peak size data 130 (step S1805). Then, the abnormality diagnosis device 101 determines whether there is a peak size different from the normal peak size among the identified peak sizes based on the comparison result (step S1806).

Here, when it is determined that there is no different peak size ("No" in step S1806), the abnormality diagnosis device 101 returns to the step in which the abnormal peak size extraction processing has been called. Meanwhile, when it is determined that there is a different peak size ("Yes" in step S1806), the abnormality diagnosis device 101 extracts the different peak size as an abnormal peak size (step S1807), and returns to the step in which the abnormal peak size extraction processing has been called.

In this way, it is possible to extract an abnormal peak size to narrow down response message candidates when an abnormality occurs due to a web service failure.

Next, with reference to FIGS. 19 and 20, descriptions will be made on a specific processing procedure of the service abnormality determination processing in step S1703 illustrated in FIG. 17. Here, the response time fluctuation table 1900 used for the service abnormality determination processing will be described first.

Figure 19:
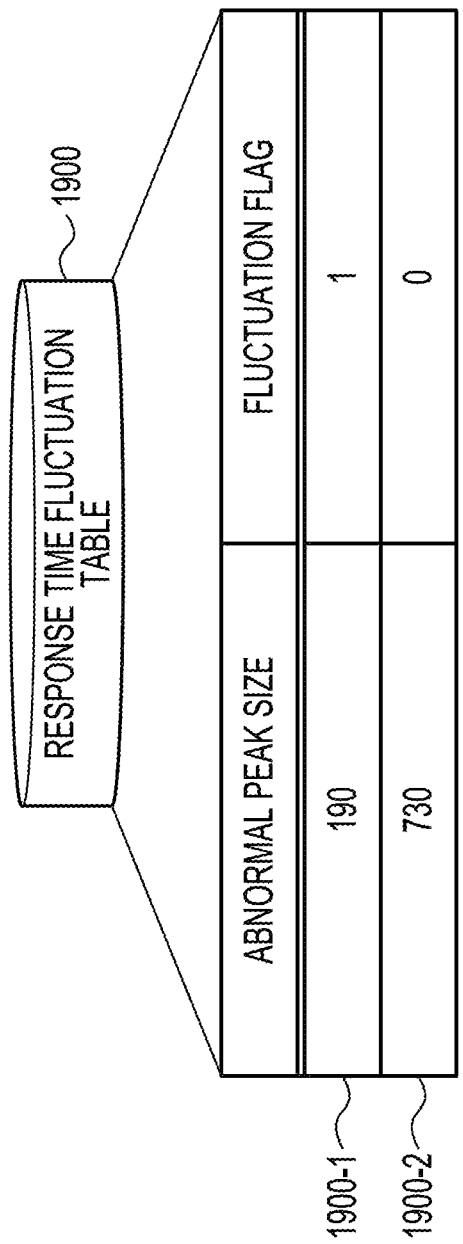
FIG. 19 is an explanatory diagram illustrating an example of storage contents of a response time fluctuation table 1900.

FIG. 19 is an explanatory diagram illustrating an example of storage contents of the response time fluctuation table 1900. In FIG. 19, the response time fluctuation table 1900 has fields of "abnormal peak size" and "fluctuation flag," and stores the response time fluctuation information (e.g., response time fluctuation information 1900-1, 1900-2) as a record by setting information in each field.

Here, the abnormal peak size refers to the abnormal peak size of the response message. The abnormal peak size which is extracted in step S1807 as illustrated in FIG. 18 is set in the "abnormal peak size" field. The "fluctuation flag" is a flag that indicates the presence or absence of a fluctuation in response time. The fluctuation flag of "0" indicates that there is no fluctuation in response time. The fluctuation flag "1" indicates that there is a fluctuation in response time.

Figure 20:
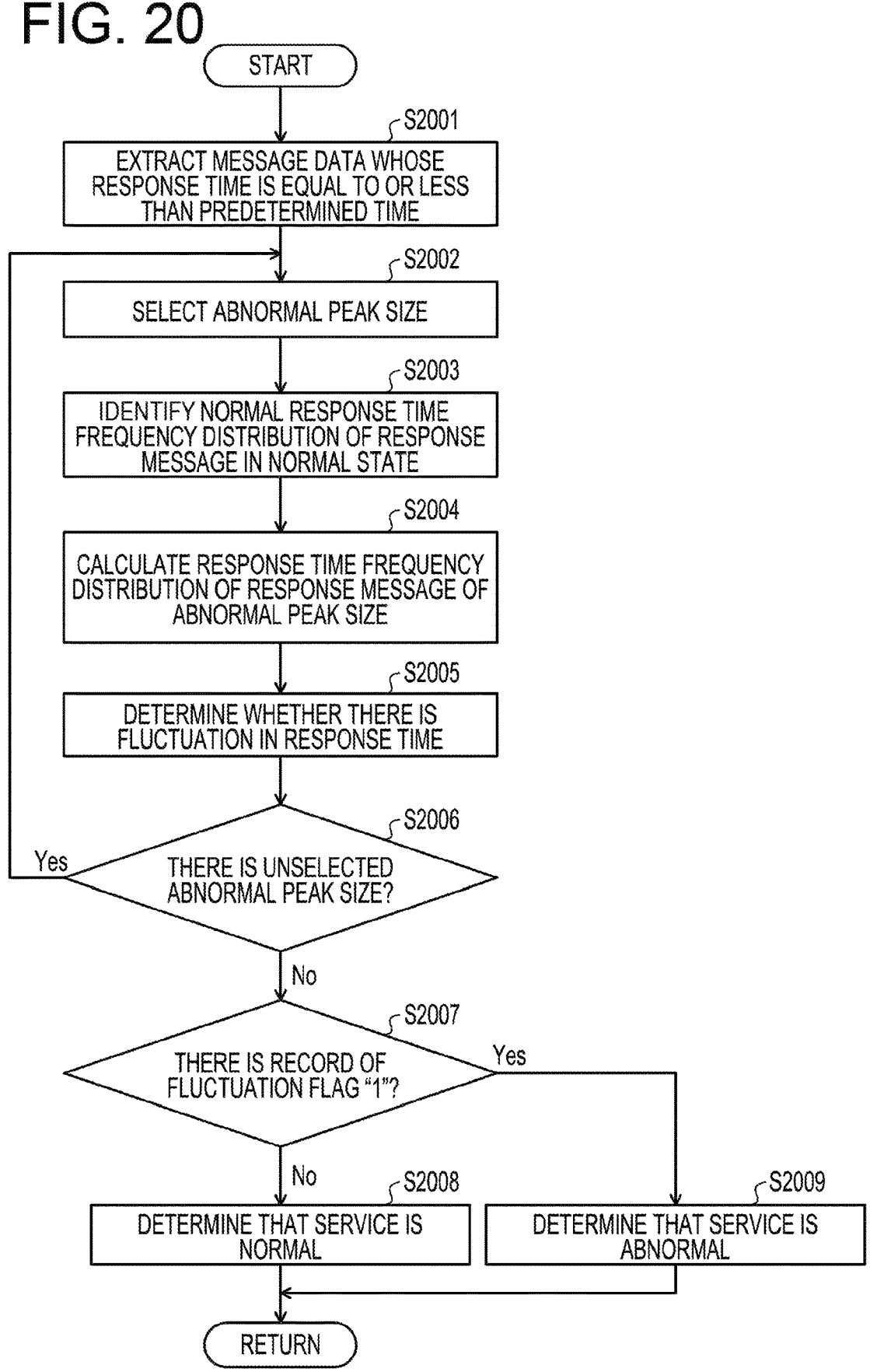
FIG. 20 is a flowchart illustrating an example of a specific processing procedure of a service abnormality determination processing.

FIG. 20 is a flowchart illustrating an example of a specific processing procedure of the service abnormality determination processing. In the flowchart of FIG. 20, the abnormality diagnosis device 101 first extracts message data that has response time which is equal to or less than a predetermined time from the message data acquired in step S1701 (step S2001).

Next, the abnormality diagnosis device 101 selects an unselected abnormal peak size which is not selected from the response time fluctuation table 1900 illustrated in FIG. 19 (step S2002). Further, when there is no abnormal peak size, the abnormality diagnosis device 101 returns to the step in which the service abnormality determination processing has been called.

In addition, the abnormality diagnosis device 101 extracts the normal response time distribution data of a representative response size corresponding to the selected abnormal peak size from the normal response time distribution DB 140, thereby identifying the normal response time frequency distribution of the response message in a normal state (step S2003).

Next, the abnormality diagnosis device 101 calculates the response time frequency distribution of the response message of the abnormal peak size based on the message data whose response size corresponds to the selected abnormal peak size among the extracted message data (step S2004). For example, the abnormality diagnosis device 101 calculates, for each of the classes divided by a predetermined time width (class width), the frequency of the response message to which the response time belongs in the relevant class.

Then, the abnormality diagnosis device 101 tests whether the calculated response time frequency distribution of the response message of the abnormal peak size is statistically different from the identified response time frequency distribution of the response message in a normal state so as to determine whether there is a fluctuation in response time (step S2005). The determined determination result is stored in the response time fluctuation table 1900.

For example, when it is determined that there is no fluctuation in response time, the fluctuation flag of "0" is stored in the response time fluctuation table 1900 in association with the selected abnormal peak size. Meanwhile, when it is determined that there is a fluctuation in response time, the fluctuation flag of "1" is stored in the response time fluctuation table 1900 in association with the selected abnormal peak size.

Next, the abnormality diagnosis device 101 determines whether there is an unselected abnormal peak size that is not selected from the response time fluctuation table 1900 (step S2006). Here, when it is determined that there is an unselected abnormal peak size ("Yes" in step S2006), the abnormality diagnosis device 101 returns to step S2002.

Meanwhile, when it is determined that there is no unselected abnormal peak size ("No" in step S2006), the abnormality diagnosis device 101 refers to the response time fluctuation table 1900 and determines whether there is a record of the fluctuation flag of "1" (step S2007). Here, when it is determined that there is no record of the fluctuation flag of "1" ("No" in step S2007), the abnormality diagnosis device 101 determines that the service to be diagnosed is normal (step S2008), and returns to the step in which the service abnormality determination processing has been called.

Meanwhile, when it is determined that there is a record of the fluctuation flag of "1" ("Yes" in step S2007), the abnormality diagnosis device 101 determines that the service to be diagnosed is abnormal (step S2009), and returns to the step in which the service abnormality determination processing has been called.

As a result, when an abnormality is occurring due to a web service failure, it is possible to diagnose an abnormality of the web service by utilizing the fact that the response time fluctuates compared to a normal state.

As described above, according to the abnormality diagnosis device 101 related to the embodiment, it is possible to acquire the message data that indicate the message size and the response time of the response message identified from a packet group which is transmitted and received within the predetermined period T. The packet group may be a packet group in which the data portion is encrypted. Then, according to the abnormality diagnosis device 101, it is possible to identify a peak size that satisfies the first condition from the response size frequency distribution based on the acquired message data, and identify a peak size which is different from the normal peak size stored in advance among the identified peak sizes.

As a result, when an abnormality such as a server error occurs, it is possible to extract an abnormal peak size to narrow down response message candidates at the time of abnormality occurrence using a tendency that the message size of the response message is concentrated around a particular value.

Further, according to the abnormality diagnosis device 101, it is possible to determine whether the response time frequency distribution of the response message of the abnormal peak size satisfies the second condition based on the acquired message data, and determine that the service is abnormal when the second condition is satisfied.

Thus, when an abnormality such as a server error occurs, it is possible to diagnose a service abnormality from the presence or absence of fluctuation in the response time of the response message of the abnormal peak size by using, for example, a tendency that a processing of returning a response immediately increases rapidly and the response time fluctuates compared to a normal state. Further, since the service abnormality may be determined without analyzing the contents (data portion) of the packet, the service abnormality diagnosis may be performed even in the case of encrypted communication.

Further, according to the abnormality diagnosis device 101, it is possible to compare the response time frequency distribution of the response message of the abnormal peak size with the response time frequency distribution of the response message in a normal state stored in advance, and determine that the second condition is satisfied when it is determined that there is a fluctuation in response time.

Thus, it is possible to determine whether there is a fluctuation in response time by testing whether the response time frequency distribution of the response message is statistically different from that in a normal state.

Further, according to the abnormality diagnosis device 101, it is possible to calculate, for each of the classes divided by a predetermined size width, the frequency (relative frequency) of response messages to which the message size belongs in the class, based on the acquired message data. Then, according to the abnormality diagnosis device 101, it is possible to identify the message size corresponding to the class that has difference in frequency with the adjacent class which is equal to or more than the threshold $\alpha$, as the peak size that satisfies the first condition, based on the calculated calculation result.

As a result, it is possible to appropriately determine the peak size at which response messages are concentrated.

Further, according to the abnormality diagnosis device 101, it is possible to identify a peak size that satisfies the first condition based on the message data that indicate the response size and the response time of the response message that has response size which is equal to or less than the predetermined size among the acquired message data.

In this way, it is possible to narrow down the response messages used for abnormality diagnosis to response messages whose message size is equal to or less than the predetermined size, in consideration of the possible range of message sizes of response messages delivered when an abnormality such as a server error occurs.

Further, according to the abnormality diagnosis device 101, when there is no abnormal peak size or when the second condition is not satisfied, it may be determined that the service is normal.

As a result, when the peak size that appears in the response size frequency distribution at the time of diagnosis is the same as in a normal state, or when the response time of the response message of the abnormal peak size does not fluctuate from a normal state, it may be diagnosed that the service is normal.

Further, according to the abnormality diagnosis device 101, the determined determination result may be output. Thus, the abnormality diagnosis result of the service may be notified to an administrator of the abnormality diagnosis system 100.

Further, according to the abnormality diagnosis device 101, it is possible to determine whether the response time frequency distribution of the response message of the abnormal peak size satisfies the second condition, based on the message data that indicate the message size and the response time of the response message that has response time which is equal to or less than the predetermined time among the acquired message data.

As a result, it is possible to narrow down the response messages used for abnormality diagnosis to response messages that has response time which is equal to or less than the predetermined time, in consideration of the possible range of response times of response messages delivered when an abnormality such as a server error occurs From these facts, according to the abnormality diagnosis system 100 and the abnormality diagnosis device 101 related to the embodiment, even in the case of encrypted communication, it is possible to diagnose an abnormality at the time of a failure such as service unavailability without modifying a system that provides the service. In addition, even in the case of non-encrypted communication, it is possible to perform a service abnormality diagnosis without performing a processing of analyzing the protocol of a response data packet and acquiring a status code, so that it becomes possible to cope with large-volume communication traffic.

Further, the abnormality diagnosis method described in the present embodiment may be implemented by executing a prepared program on a computer such as a personal computer or a workstation. The abnormality diagnosis program is recorded on a computer-readable recording medium such as a hard disk, a flexible disk, a compact disk (CD)-ROM, a magneto-optical disk (MO), a digital versatile disk (DVD), and a universal serial bus (USB) memory, and executed by being read from the recording medium by a computer. Further, the abnormality diagnosis program may be distributed via a network such as the Internet.

In addition, the abnormality diagnosis device 101 described in the present embodiment may also be implemented by a programmable logic device (PLD) such as an application specific integrated circuit (ASIC), such as a standard cell or a structured ASIC, or an FPGA.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
   acquiring message data that indicate a message size and a response time of each response message identified from an encrypted packet group which is transmitted and received within a predetermined period;
   identifying, based on the acquired message data, first peak sizes that satisfy a first condition from a first size distribution that is a frequency distribution of the message size of each response message;
   determining based on the acquired message data, when it is determined that the first peak sizes include a second peak size different from third peak sizes, whether a first time distribution satisfies a second condition, the third peak sizes being peak sizes of the message size of each response message in a normal state and being stored in advance, the first time distribution being a frequency distribution of the response time of each response message having the second peak size; and
   determining that a service is abnormal, when it is determined that the first time distribution satisfies the second condition.

2. The non-transitory computer-readable recording medium according to claim 1, the process further comprising:
   comparing the first time distribution with a second time distribution stored in advance, the second time distribution being a frequency distribution of the response time of each response message in the normal state; and
   determining that the second condition is satisfied, when it is determined that there is a fluctuation in response time based on a result of the comparison.

3. The non-transitory computer-readable recording medium according to claim 1, the process further comprising:
   calculating based on the message data, for each of classes divided by a predetermined size width, a frequency of response messages having a message size that belongs to each of the classes; and
   identifying, based on a result of the calculation, message sizes each corresponding to a class that is different in frequency of response messages from an adjacent class by a predetermined threshold value or more, as the first peak sizes.

4. The non-transitory computer-readable recording medium according to claim 1, the process further comprising:
   identifying the first peak sizes based on message data that indicate a message size and a response time of each response message having a message size equal to or less than a predetermined size among the acquired message data.

5. The non-transitory computer-readable recording medium according to claim 1, the process further comprising:
   determining that the service is normal when it is determined that the first peak sizes include no second peak size different from the third peak sizes or when it is determined that the first time distribution does not satisfy the second condition.

6. The non-transitory computer-readable recording medium according to claim 1, the process further comprising:
   outputting a determination result indicating that the service is abnormal.

7. The non-transitory computer-readable recording medium according to claim 1, wherein
   the encrypted packet group is transmitted and received for the service within the predetermined period.

8. The non-transitory computer-readable recording medium according to claim 1, the process further comprising:
   determining whether the first time distribution satisfies the second condition based on message data that indicate a message size and a response time of each response message having a response time equal to or less than a predetermined time among the acquired message data.

9. An abnormality diagnosis method, comprising:
   acquiring, by a computer, message data that indicate a message size and a response time of each response message identified from an encrypted packet group which is transmitted and received within a predetermined period;
   identifying, based on the acquired message data, first peak sizes that satisfy a first condition from a first size distribution that is a frequency distribution of the message size of each response message;
   determining based on the acquired message data, when it is determined that the first peak sizes include a second peak size different from third peak sizes, whether a first time distribution satisfies a second condition, the third peak sizes being peak sizes of the message size of each response message in a normal state and being stored in advance, the first time distribution being a frequency distribution of the response time of each response message having the second peak size; and determining that a service is abnormal, when it is determined that the first time distribution satisfies the second condition.

10. An information processing apparatus, comprising:

a memory; and a processor coupled to the memory and the processor configured to:

acquire message data that indicate a message size and a response time of each response message identified from an encrypted packet group which is transmitted and received within a predetermined period;

identify, based on the acquired message data, first peak sizes that satisfy a first condition from a first size distribution that is a frequency distribution of the message size of each response message;

determine based on the acquired message data, when it is determined that the first peak sizes include a second peak size different from third peak sizes, whether a first time distribution satisfies a second condition, the third peak sizes being peak sizes of the message size of each response message in a normal state and being stored in the memory, the first time distribution being a frequency distribution of the response time of each response message having the second peak size; and determine that a service is abnormal, when it is determined that the first time distribution satisfies the second condition.

* * * * *